(12) United States Patent
Ouderkirk et al.

(10) Patent No.: US 8,542,441 B2
(45) Date of Patent: Sep. 24, 2013

(54) HIGH DURABILITY COLOR COMBINER

(75) Inventors: Andrew J. Ouderkirk, Grange Garden (SG); Stephen J. Willett, St. Paul, MN (US); Charles L. Bruzzone, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 148 days.

(21) Appl. No.: 13/129,152

(22) PCT Filed: Nov. 10, 2009

(86) PCT No.: PCT/US2009/063779
§ 371 (c)(1),
(2), (4) Date: May 13, 2011

(87) PCT Pub. No.: WO2010/059453
PCT Pub. Date: May 27, 2010

(65) Prior Publication Data
US 2011/0216396 A1 Sep. 8, 2011

Related U.S. Application Data

(60) Provisional application No. 61/116,061, filed on Nov. 19, 2008.

(51) Int. Cl.
*G02B 5/30* (2006.01)
*G02B 27/28* (2006.01)

(52) U.S. Cl.
USPC ............ 359/487.01; 359/485.01; 359/489.07

(58) Field of Classification Search
USPC ................ 359/487, 237, 290–292, 298, 349, 359/483, 490, 501–502, 487.01, 485.01, 359/485.02, 485.07, 489.07
See application file for complete search history.

(56) References Cited

U.S. PATENT DOCUMENTS

| 3,497,283 | A | | 2/1970 | Law |
| 4,424,589 | A | * | 1/1984 | Thomas et al. ............... 382/317 |
| 5,067,799 | A | | 11/1991 | Gold et al. |
| 5,541,673 | A | * | 7/1996 | Shioya et al. ................ 348/752 |
| 5,962,114 | A | | 10/1999 | Jonza et al. |
| 6,490,081 | B1 | | 12/2002 | Feillens et al. |
| 6,550,919 | B1 | | 4/2003 | Heine |
| 6,583,833 | B1 | | 6/2003 | Kashima |
| 6,636,276 | B1 | | 10/2003 | Rosenbluth |

(Continued)

FOREIGN PATENT DOCUMENTS

| CN | 1749807 | 3/2006 |
| CN | 101046602 | 10/2007 |
| JP | 2004-020621 | 1/2004 |
| JP | 2005-3825 | 1/2005 |
| JP | 2007-011179 | 1/2007 |
| WO | WO 94/25894 | 11/1994 |
| WO | WO 2004/114003 | 12/2004 |
| WO | WO 2006/124993 | 11/2006 |

*Primary Examiner* — Thomas K Pham
*Assistant Examiner* — Brandi Thomas

(57) ABSTRACT

Optical elements, color combiners using the optical elements, and image projectors using the color combiners are described. The optical elements can be configured as color combiners that receive different wavelength spectrums of light and produce a combined light output that includes the different wavelength spectrums of light. The optical elements include a wavelength selective dichroic mirror that reflects a major portion of actinic light that can damage a reflective polarizer within the optical element. The wavelength selective dichroic mirror transmits a major portion of other wavelengths of light. The resulting color combiners using the optical element may have improved durability compared to a color combiner lacking the wavelength selective dichroic mirror. Image projectors using the color combiners can include reflective (including digital micro-mirror) or polarization (including liquid crystal) imaging modules.

16 Claims, 11 Drawing Sheets

(56) References Cited

U.S. PATENT DOCUMENTS

| | | | |
|---|---|---|---|
| 6,704,065 B1 * | 3/2004 | Sharp et al. | 349/5 |
| 6,721,096 B2 | 4/2004 | Bruzzone et al. | |
| 6,857,747 B2 | 2/2005 | Pentico et al. | |
| 7,360,900 B2 | 4/2008 | Sakata et al. | |
| 2002/0154420 A1 | 10/2002 | Magarill et al. | |
| 2003/0184864 A1 | 10/2003 | Bruzzone et al. | |
| 2003/0227680 A1 | 12/2003 | Chen et al. | |
| 2004/0145705 A1 * | 7/2004 | Hamada et al. | 353/31 |
| 2004/0207919 A1 | 10/2004 | Chen et al. | |
| 2006/0007538 A1 | 1/2006 | Robinson | |
| 2006/0007539 A1 | 1/2006 | Mihalakis | |
| 2006/0028620 A1 | 2/2006 | Conner | |
| 2006/0028729 A1 | 2/2006 | Nishiwaki et al. | |
| 2006/0055888 A1 * | 3/2006 | Inoko | 353/20 |
| 2006/0164857 A1 | 7/2006 | Morejon et al. | |
| 2006/0171035 A1 | 8/2006 | Berman et al. | |
| 2007/0115206 A1 * | 5/2007 | Kanaya | 345/31 |
| 2008/0018861 A1 | 1/2008 | Schuck et al. | |
| 2008/0231953 A1 | 9/2008 | Young | |
| 2008/0266526 A1 | 10/2008 | Kodama et al. | |
| 2008/0285129 A1 | 11/2008 | Magarill et al. | |

* cited by examiner

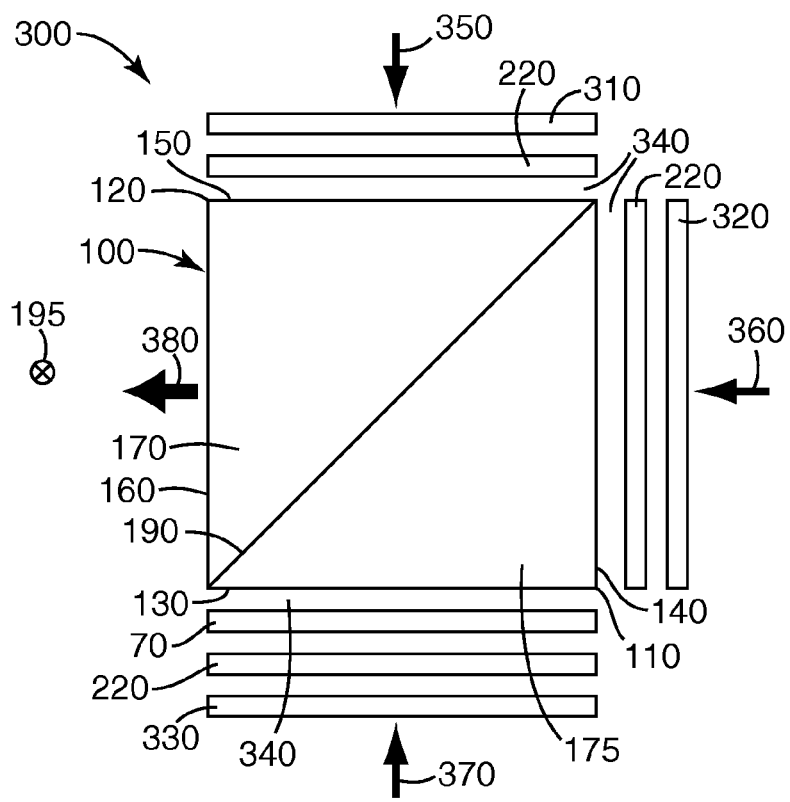
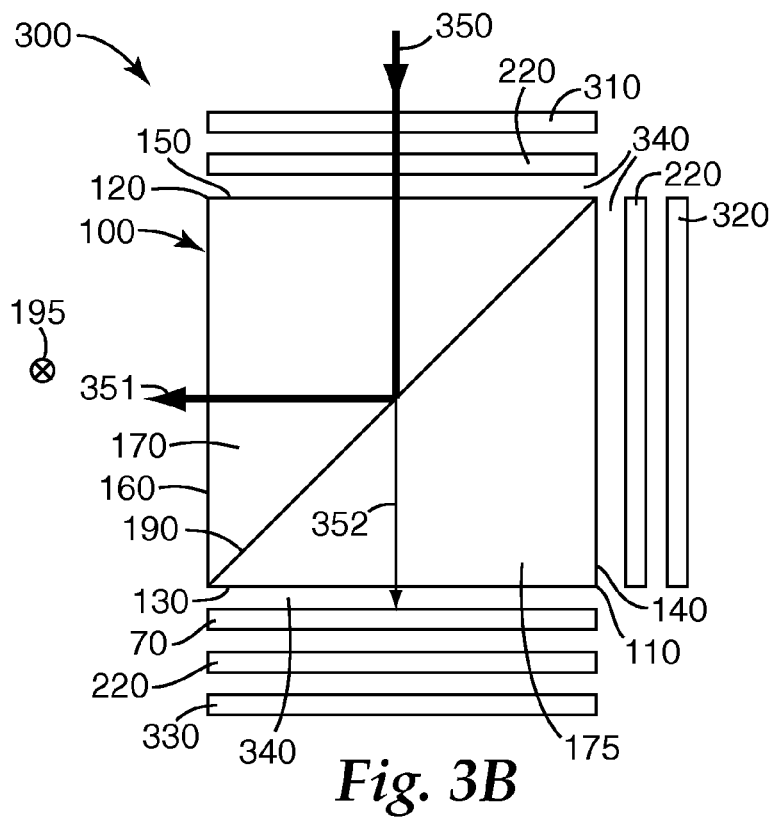

HIGH DURABILITY COLOR COMBINER

CROSS REFERENCE TO RELATED APPLICATIONS

This application is a national stage filing under 35 U.S.C. 371 of PCT/US2009/063779, filed Nov. 10, 2009, which claims priority to U.S. Application No. 61/116,061, filed Nov. 19, 2008, the disclosure of which is incorporated by reference in its/their entirety herein.

BACKGROUND

Projection systems used for projecting an image on a screen can use multiple color light sources, such as light emitting diodes (LED's), with different colors to generate the illumination light. Several optical elements are disposed between the LED's and the image display unit to combine and transfer the light from the LED's to the image display unit. The image display unit can use various methods to impose an image on the light. For example, the image display unit may use polarization, as with transmissive or reflective liquid crystal displays.

Still other projection systems used for projecting an image on a screen can use white light configured to imagewise reflect from a digital micro-mirror array, such as the array used in Texas Instruments' Digital Light Processor (DLP®) displays. In the DLP® display, individual mirrors within the digital micro-mirror array represent individual pixels of the projected image. A display pixel is illuminated when the corresponding mirror is tilted so that incident light is directed into the projected optical path. A rotating color wheel placed within the optical path is timed to the reflection of light from the digital micro-mirror array, so that the reflected white light is filtered to project the color corresponding to the pixel. The digital micro-mirror array is then switched to the next desired pixel color, and the process is continued at such a rapid rate that the entire projected display appears to be continuously illuminated. The digital micro-mirror projection system requires fewer pixelated array components, which can result in a smaller size projector.

LED illumination is becoming a common method for projection illumination. LEDs offer long life, high color gamut, high efficiency, the ability to be strobed for sequential imagers, and contain no mercury. However, LEDs have a relatively low brightness. One way of at least doubling the effective brightness of a white source made from red, green, and blue LEDs is to use a color combiner, which uses dichroic filters to make the individual colors of LEDs optically appear to spatially overlap with each other. These types of devices are broadly described as being "color combiners".

Color combiners typically use dichroic filters that are tilted relative to the light beams passing through them. 3M Company has recently developed color combiners where the dichroic filters are at normal incidence angles to the average light path for the LED output, and the light is effectively diverted through a combination of a reflective polarizer and quarter wave plates.

Image brightness is an important parameter of a projection system. The brightness of color light sources and the efficiencies of collecting, combining, homogenizing and delivering the light to the image display unit all affect brightness. As the size of modern projector systems decreases, there is a need to maintain an adequate level of output brightness while at the same time keeping heat produced by the color light sources at a low level that can be dissipated in a small projector system. There is a need for a light combining system that combines multiple color lights with increased efficiency to provide a light output with an adequate level of brightness without excessive power consumption by light sources. There is also a need for a light combining system that directs light of different wavelength spectra in a manner to minimize the degradation of the wavelength-sensitive components in the light combiner.

SUMMARY

Generally, the present description relates to high-durability optical elements, color combiners using the optical elements, and image projectors using the color combiners. In one aspect, an optical element includes a first color-selective dichroic filter having a first input surface, disposed to transmit a first color light beam perpendicular to the first input surface; a color-selective dichroic mirror disposed to intercept the first color light beam at an angle of approximately 45 degrees; and a reflective polarizer disposed adjacent the color-selective dichroic mirror, opposite the first color-selective dichroic filter. The color-selective dichroic mirror is capable of reflecting a major portion of the first color light beam. In one embodiment, the first color light beam includes a wavelength of light that is capable of degrading the reflective polarizer. In another embodiment, the optical element further includes a second color-selective dichroic filter having a second input surface disposed to transmit a second color light beam perpendicular to the second input surface, and intercept the reflective polarizer at an angle of approximately 45 degrees, wherein the color-selective dichroic mirror is capable of transmitting a major portion of the second color light beam. In yet another embodiment, the optical element further includes a third color-selective dichroic filter having a third input surface disposed to transmit a third color light beam perpendicular to the third input surface, and intercept the reflective polarizer at an angle of approximately 45 degrees, wherein the color-selective dichroic mirror is capable of transmitting a major portion of the third color light beam.

In another aspect, a color combiner includes an optical element. The optical element includes a first color-selective dichroic filter having a first input surface, disposed to transmit a first color light beam perpendicular to the first input surface; a color-selective dichroic mirror disposed to intercept the first color light beam at an angle of approximately 45 degrees; and a reflective polarizer disposed adjacent the color-selective dichroic mirror, opposite the first color-selective dichroic filter, wherein the color-selective dichroic mirror is capable of reflecting a major portion of the first color light beam. In one embodiment, the first color light beam includes a wavelength of light that is capable of degrading the reflective polarizer. In another embodiment, the optical element further includes a second color-selective dichroic filter having a second input surface disposed to transmit a second color light beam perpendicular to the second input surface, and intercept the reflective polarizer at an angle of approximately 45 degrees, wherein the color-selective dichroic mirror is capable of transmitting a major portion of the second color light beam. In yet another embodiment, the optical element further includes a third color-selective dichroic filter having a third input surface disposed to transmit a third color light beam perpendicular to the third input surface, and intercept the reflective polarizer at an angle of approximately 45 degrees, wherein the color-selective dichroic mirror is capable of transmitting a major portion of the third color light beam.

In yet another aspect, a projection system includes an optical element. The optical element includes a first color-selective dichroic filter having a first input surface, disposed to transmit a first color light beam perpendicular to the first input surface; a color-selective dichroic mirror disposed to intercept the first color light beam at an angle of approximately 45 degrees; and a reflective polarizer disposed adjacent the color-selective dichroic mirror, opposite the first color-selective dichroic filter, wherein the color-selective dichroic mirror is capable of reflecting a major portion of the first color light beam. In one embodiment, the first color light beam includes a wavelength of light that is capable of degrading the reflective polarizer. In another embodiment, the optical element further includes a second color-selective dichroic filter having a second input surface disposed to transmit a second color light beam perpendicular to the second input surface, and intercept the reflective polarizer at an angle of approximately 45 degrees, wherein the color-selective dichroic mirror is capable of transmitting a major portion of the second color light beam. In yet another embodiment, the optical element further includes a third color-selective dichroic filter having a third input surface disposed to transmit a third color light beam perpendicular to the third input surface, and intercept the reflective polarizer at an angle of approximately 45 degrees, wherein the color-selective dichroic mirror is capable of transmitting a major portion of the third color light beam.

In yet another aspect, an optical element includes a first color-selective dichroic filter having a first input surface, disposed to transmit a first color light beam perpendicular to the first input surface; a reflective polarizer disposed to intercept the first color light beam at an angle of approximately 45 degrees; an output surface disposed to transmit the first color light beam in an output direction perpendicular to the output surface; and a color-selective dichroic mirror disposed to intercept both the first color light beam and a second color light beam at an angle of approximately 45 degrees. The color-selective dichroic mirror is capable of reflecting a first major portion of the second color light beam in the output direction, and transmitting a second major portion of the first light beam in the output direction. In one embodiment, the optical element further includes a second color-selective dichroic filter having a second input surface, disposed to transmit a third color light beam perpendicular to the second input surface, the third color light beam capable of intercepting both the reflective polarizer and the color selective dichroic mirror at an angle of approximately 45 degrees. The color-selective dichroic mirror is capable of transmitting a third major portion of the third light beam in the output direction.

BRIEF DESCRIPTION OF THE DRAWINGS

Throughout the specification reference is made to the appended drawings, where like reference numerals designate like elements, and wherein:

FIGS. 3A-3D are top view schematics of a light combiner.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
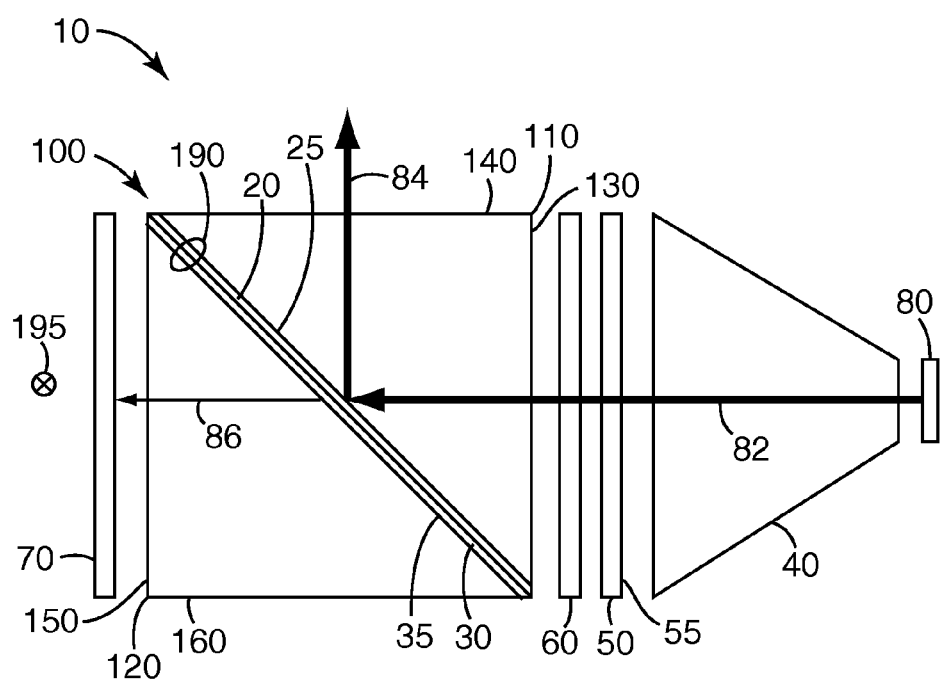
FIG. 1A is a schematic view of an optical element.

The optical elements described herein can be configured as high durability color combiners that receive different wavelength spectrum lights and produce a combined light output that includes the different wavelength spectrum lights. In one aspect, the received light inputs are polarized, and the combined light output is polarized. In another aspect, the received light inputs are unpolarized, and the combined light output is unpolarized. In some embodiments, the combined light has the same etendue as each of the received lights. The combined light can be a polychromatic combined light that comprises more than one wavelength spectrum of light. The combined light can be a time sequenced output of each of the received lights. In one aspect, each of the different wavelength spectra of light corresponds to a different color light (e.g. red, green and blue), and the combined light output is white light, or a time sequenced red, green and blue light. For purposes of the description provided herein, "color light" and "wavelength spectrum light" are both intended to mean light having a wavelength spectrum range which may be correlated to a specific color if visible to the human eye. The more general term "wavelength spectrum light" refers to both visible and other wavelength spectrums of light including, for example, infrared light.

Also for the purposes of the description provided herein, the term "aligned to a desired polarization state" is intended to associate the alignment of the pass axis of an optical element to a desired polarization state of light that passes through the optical element, i.e., a desired polarization state such as s-polarization, p-polarization, right-circular polarization, left-circular polarization, or the like. In one embodiment described herein with reference to the Figures, an optical element such as a polarizer aligned to the first polarization state means the orientation of the polarizer that passes the p-polarization state of light, and reflects or absorbs the second polarization state (in this case the s-polarization state) of light. It is to be understood that the polarizer can instead be aligned to pass the s-polarization state of light, and reflect or absorb the p-polarization state of light, if desired.

Also for the purposes of the description provided herein, the term "facing" refers to one element disposed so that a perpendicular line from the surface of the element follows an optical path that is also perpendicular to the other element. One element facing another element can include the elements disposed adjacent each other. One element facing another element further includes the elements separated by optics so that a light ray perpendicular to one element is also perpendicular to the other element.

According to one aspect, the optical element includes a first color-selective dichroic filter positioned to transmit a first color light toward a reflective polarizer. The first color light passes through the first color-selective dichroic filter at near-normal incidence (i.e., approximately 90 degrees to the surface of the filter) and intercepts the reflective polarizer at an angle of approximately 45 degrees. A color-selective dichroic mirror is positioned adjacent to the reflective polarizer, and serves to protect the reflective polarizer from light that can be damaging to the reflective polarizer (i.e., actinic light such as higher energy blue or ultraviolet (UV) light). The color-selective dichroic mirror intercepts the first color light (i.e., the potentially damaging light) before intercepting the reflective polarizer. The color-selective dichroic mirror reflects a major portion of the first color light, and transmits a minor portion through to the reflective polarizer. In one aspect, the major portion reflected by the color-selective dichroic mirror can be greater than 51%, 60%, 70%, 75%, 80%, 85%, or even greater than 90% of the first color light incident on the color-selective dichroic mirror.

One advantage of color combiners having color-selective dichroic filters used at normal incidence angles is that they can be used with low F-number optical systems. One disadvantage is that the reflective polarizer needs to have a low absorptivity, a wide angular acceptance range, and long life under intense exposure to actinic light. Color combiners using 3M Company's MZIP or APF Multilayer Optical Film (MOF) reflective polarizer have sufficient angular and broad band optical performance, but can photo-degrade by actinic light such as UV, blue, and possibly green light. Applications suitable for color combiners can require that the reflective polarizer be exposed to actinic light for long periods of time, which can degrade the reflective polarizer. The present disclosure describes a durable color combiner with improved reflective polarizer photo-stability.

The processes by which reflective polarizers photo-degrade is partially understood. Although not wishing to be bound by theory, the process is believed to occur through the following steps:
1. Actinic light (UV, blue, and some green wavelengths) causes bond scission in the polyester in the reflective polarizer.
2. The cleaved polymer chains in the amorphous regions of the semi-crystalline polyester then re-arrange to form larger crystals, or extend conjugation within the polyester, causing increased absorptivity of the polymer.
3. The larger crystals scatter light.
4. The scattered light has an increased average path length, increasing the rate of bond scission, absorption, and eventually resulting in higher temperatures.
5. Under low light intensities, the efficiency of the polarizer decreases. Under high light intensities, the reflective polarizer can catastrophically fail due to heating.

Other degradation processes, including those that drop the polarization ratio, are believed to occur, but these processes can be less significant than the above.

When two or more unpolarized color lights are directed to the optical element, each may be split according to polarization by one or more reflective polarizers. According to one embodiment described below, a color light combining system receives unpolarized light from different color unpolarized light sources, and produces a combined light output that is either unpolarized, or polarized in one desired state. In one aspect, two, three, four, or more received color lights are each split according to polarization (e.g. s-polarization and p-polarization, or right and left circular polarization) by a reflective polarizer in the optical element. The received light of one polarization state is recycled to become the desired polarization state.

According to one aspect, the optical element comprises a reflective polarizer positioned so that light from each of the three color lights intercept the reflective polarizer at approximately a 45 degree angle. The reflective polarizer can be any known reflective polarizer such as a MacNeille polarizer, a wire grid polarizer, a multilayer optical film polarizer, or a circular polarizer such as a cholesteric liquid crystal polarizer. According to one embodiment, a multilayer optical film polarizer can be a preferred reflective polarizer.

Multilayer optical film polarizers can include different "packets" of layers that serve to interact with different wavelength ranges of light. For example, a unitary multilayer optical film polarizer can include several packets of layers through the film thickness, each packet interacting with a different wavelength range (e.g. color) of light to reflect one polarization state and transmit the other polarization state. In one aspect, a multilayer optical film can have a first packet of layers adjacent a first surface of the film that interacts with, for example, blue colored light (i.e., a "blue layers"), a second packet of layers that interacts with, for example, green colored light (i.e., a "green layers"), and a third packet of layers adjacent a second surface of the film that interacts with, for example, red colored light (i.e. a "red layers"). Typically, the separation between layers in the "blue layers" is much smaller than the separation between layers in the "red layers", in order to interact with the shorter (and higher energy) blue wavelengths of light.

Polymeric multilayer optical film polarizers can be particularly preferred reflective polarizers that can include packets of film layers as described above. Often, the higher energy wavelengths of light, such as blue light, can adversely affect the aging stability of the film, and at least for this reason it is preferable to minimize the number of interactions of blue light with the reflective polarizer. In addition, the nature of the interaction of blue light with the film affects the severity of the adverse aging. Transmission of blue light through the film is generally less detrimental to the film than reflection of blue light entering from the "blue layers" (i.e. thin layers) side. Also, reflection of blue light entering the film from the "blue layers" side is less detrimental to the film than reflection of blue light entering from the "red layers" (i.e., thick layers) side. Techniques have been described to reduce the number of interactions of actinic light with the reflective polarizer, as well as to reduce the severity of the interactions, for example, by placement and orientation of the reflective polarizer. Suitable techniques are described, for example, in co-pending Ser. No. 61/116,072 entitled POLARIZATION CONVERTING COLOR COMBINER, filed on an even date herewith.

In one aspect, the present disclosure is directed toward further improving the stability of the reflective polarizer in an optical element such as a color combiner, by preventing a majority of the actinic light from ever reaching the reflective polarizer. A color-selective dichroic mirror reflects a major portion of the actinic light, while transmitting the major portions of other wavelengths of light. In one aspect, the color-selective dichroic mirror is disposed adjacent to the reflective polarizer. In one embodiment, the color-selective dichroic mirror can be formed directly on the reflective polarizer. In another embodiment, the color-selective dichroic mirror can instead be formed on an optical element such as a diagonal prism face that is then positioned adjacent the reflective polarizer. In yet another embodiment, the color-selective dichroic mirror can be a separate film or plate element that is positioned adjacent the reflective polarizer. The color-selective dichroic mirror can be formed by any known process, such as vacuum deposition of an inorganic dielectric stack. In one aspect of the present disclosure, the blue layers can be eliminated from the reflective polarizer, since a major portion of the blue light is reflected by the color-selective dichroic mirror before the blue light interacts with the reflective polarizer.

The reflective polarizer and the color-selective dichroic mirror are herein referred to as a "protected reflective polarizer (PRP)", and can be disposed between the diagonal faces of two prisms The PRP can instead be a free-standing film such as a pellicle. In some embodiments, the optical element light utilization efficiency is improved when the PRP is disposed between two prisms, e.g. a polarizing beam splitter (PBS). In this embodiment, some of the light traveling through the PBS that would otherwise be lost from the optical path can undergo Total Internal Reflection (TIR) from the prism faces and rejoin the optical path. For at least this reason, the following description is directed to optical elements where the PRP is disposed between the diagonal faces of two prisms; however, it is to be understood that the PBS can function in the same manner when used as a pellicle. In one aspect, all of the external faces of the PBS prisms are highly polished so that light entering the PBS undergoes TIR. In this manner, light is contained within the PBS and the light is partially homogenized while still preserving etendue.

According to one aspect, wavelength selective filters such as color-selective dichroic filters are placed in the path of input light from each of the different colored light sources. Each of the color-selective dichroic filters is positioned so that an input light beam intercepts the filter at near-normal incidence to minimize splitting of s- and p-polarized light, and also to minimize color shifting. Each of the color-selective dichroic filters is selected to transmit light having a wavelength spectrum of the adjacent input light source, and reflect light having a wavelength spectrum of at least one of the other input light sources. In some embodiments, each of the color-selective dichroic filters is selected to transmit light having a wavelength spectrum of the adjacent input light source, and reflect light having a wavelength spectrum of all of the other input light sources. In one aspect, each of the color-selective dichroic filters is positioned relative to the reflective polarizer so that the near-normal input light beam to the surface of each color-selective dichroic filter intersects the reflective polarizer at an intercept angle of approximately 45 degrees. By normal to the surface of a color-selective dichroic filter is meant a line passing perpendicular to the surface the color-selective dichroic filter; by near-normal is meant varying less than about 20 degrees from normal, or preferably less than about 10 degrees from normal. In one embodiment, the intercept angle with the reflective polarizer ranges from about 25 to 65 degrees; from 35 to 55 degrees; from 40 to 50 degrees; from 43 to 47 degrees; or from 44.5 to 45.5 degrees.

In one embodiment, a retarder is placed between the color-selective dichroic filter and the PRP. The particular combination of color-selective dichroic filters, retarders, and source orientation all cooperate to enable a smaller, more compact, optical element that, when configured as a color combiner, efficiently produces combined light. According to one aspect, the retarder is a quarter-wave retarder aligned at approximately 45 degrees to a polarization state of the reflective polarizer. In one embodiment, the alignment can be from 35 to 55 degrees; from 40 to 50 degrees; from 43 to 47 degrees; or from 44.5 to 45.5 degrees to a polarization state of the reflective polarizer.

In one aspect, the first color light comprises an unpolarized blue light, the second color light comprises an unpolarized green light and the third color light comprises an unpolarized red light, and the color light combiner combines the red light, blue light and green light to produce unpolarized white light. In one embodiment, the color light combiner combines the red, green and blue light to produce a time sequenced unpolarized red, green and blue light. In one aspect, each of the first, second and third color lights are disposed in separate light sources. In another aspect, more than one of the three color lights is combined into one of the sources. In yet another aspect, more than three color lights are combined in the optical element to produce a combined light.

The light beam includes light rays that can be collimated, convergent, or divergent when it enters the PBS. Convergent or divergent light entering the PBS can be lost through one of the faces or ends of the PBS. To avoid such losses, all of the exterior faces of a prism based PBS can be polished to enable total internal reflection (TIR) within the PBS. Enabling TIR improves the utilization of light entering the PBS, so that substantially all of the light entering the PBS within a range of angles is redirected to exit the PBS through the desired face.

A polarization component of each color light can pass through to a polarization rotating reflector. The polarization rotating reflector reverses the propagation direction of the light and alters the magnitude of the polarization components, depending of the type and orientation of a retarder disposed in the polarization rotating reflector. The polarization rotating reflector can include a wavelength-selective mirror, such as a color-selective dichroic filter, and a retarder. The retarder can provide any desired retardation, such as an eighth-wave retarder, a quarter-wave retarder, and the like. In embodiments described herein, there is an advantage to using a quarter-wave retarder and an associated color-selective dichroic reflector. Linearly polarized light is changed to circularly polarized light as it passes through a quarter-wave retarder aligned at an angle of 45° to the axis of light polarization. Subsequent reflections from the reflective polarizer and quarter-wave retarder/reflectors in the color combiner result in efficient combined light output from the color combiner. In contrast, linearly polarized light is changed to a polarization state partway between s-polarization and p-polarization (either elliptical or linear) as it passes through other retarders and orientations, and can result in a lower efficiency of the combiner. Polarization rotating reflectors generally comprise a color-selective dichroic filter and retarder. The position of the retarder and color-selective dichroic filter relative to the adjacent light source is dependent on the desired path of each of the polarization components, and are described elsewhere with reference to the Figures. In one aspect, the reflective polarizer can be a circular polarizer such as a cholesteric liquid crystal polarizer. According to this aspect, polarization rotating reflectors can comprise color-selective dichroic filters without any associated retarders.

The components of the optical element including prisms, reflective polarizers, quarter-wave retarders, mirrors, filters or other components can be bonded together by a suitable optical adhesive. The optical adhesive used to bond the components together has a lower index of refraction than the index of refraction of the prisms used in the optical element. An optical element that is fully bonded together offers advantages including alignment stability during assembly, handling and use. In some embodiments, two adjacent prisms can be bonded together using an optical adhesive. In some embodiments, a unitary optical component can incorporate the optics of the two adjacent prisms; e.g., such as a single triangular prism which incorporates the optics of two adjacent triangular prisms, as described elsewhere.

The embodiments described above can be more readily understood by reference to the Figures and their accompanying description, which follows.

FIG. 1A is a schematic view of an optical element 10, according to one aspect of the disclosure. Optical element 10 includes a PBS 100, a first color light source 80, an optional light tunnel 40, a first color-selective dichroic filter 50 having an input surface 55, a quarter-wave retarder 60, and an optional wavelength selective absorber 70. PBS 100 is further described with reference to FIG. 1B below, and includes a first prism 110 having a first prism face 130, a second prism face 140, and a diagonal prism face 25 between them. PBS 100 further includes a second prism 120 having a third prism face 150, a fourth prism face 160, and a diagonal prism face 35 between them. PBS 100 still further includes a protected reflective polarizer (PRP) 190 disposed between the two diagonal prism faces 25, 35. PRP 190 includes a color-selective dichroic mirror 20 and a reflective polarizer 30. The relative alignment and orientation of PRP 190 to quarter-wave retarder 60 in optical element 10 is described elsewhere, and with reference to FIG. 1B and FIG. 2.

First color light source 80 is an actinic light source that can be damaging to an unprotected reflective polarizer, as described elsewhere. A first color light 82 passes through an optional light tunnel 40 and intercepts the input surface 55 of color-selective dichroic filter 50 in an approximately perpendicular direction as shown. First color light 82 passes through color-selective dichroic filter 50, quarter-wave retarder 60, enters PBS 100 through first prism face 130 and intercepts color-selective dichroic mirror 20 at an approximately 45 degree angle. A major portion 84 of first color light 82 from first color light source 80 is reflected from color-selective dichroic mirror 20 in PRP 190, before first color light 82 intercepts reflective polarizer 30. A minor portion 86 of first color light 82 passes through color-selective dichroic mirror 20 toward reflective polarizer 30 in PRP 190. FIG. 1A shows that minor portion 86 of first color light 82 passes through reflective polarizer 30 (potentially causing some damage) and is absorbed by optional wavelength selective absorber 70. In some embodiments, optional wavelength selective absorber 70 can be disposed anywhere within the optical path of the actinic light, for example: between color-selective dichroic mirror 20 and reflective polarizer 30; between reflective polarizer 30 and diagonal prism face 35; adjacent third prism face 150; or separated from third prism face 150 as shown in FIG. 1A.

According to another aspect, optional light tunnel 40 or assemblies of lenses (not shown) can provide spacing that separates the light sources from other components, as well as provide for some collimation of light, as described elsewhere. Light tunnels could have straight or curved sides, or they could be replaced by a lens system. Different approaches may be preferred depending on specific details of each application, and those with skill in the art will face no difficulty in selecting the optimal approach for a specific application.

Figure 1B:
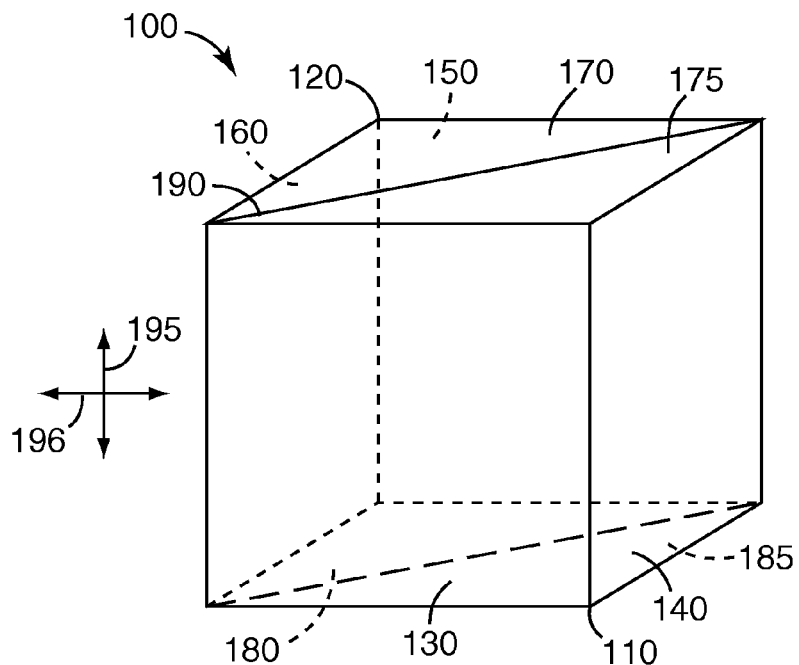
FIG. 1B is a perspective view of a PBS.

FIG. 1B is a perspective view of a PBS. PBS 100 includes protected reflective polarizer (PRP) 190 disposed between the diagonal faces of prisms 110 and 120. PRP 190 includes color-selective dichroic mirror 20 and reflective polarizer 30 as described with reference to FIG. 1A. Prism 110 includes two end faces 175, 185, and a first and second prism face 130, 140 having a 90° angle between them. Prism 120 includes two end faces 170, 180, and a third and fourth prism face 150, 160 having a 90° angle between them. The first prism face 130 is parallel to the third prism face 150, and the second prism face 140 is parallel to the fourth prism face 160. The identification of the four prism faces shown in FIG. 1B with a "first", "second", "third" and "fourth" serves only to clarify the description of PBS 100 in the discussion that follows. PRP 190 can include a Cartesian reflective polarizer or a non-Cartesian reflective polarizer. A non-Cartesian reflective polarizer can include multilayer inorganic films such as those produced by sequential deposition of inorganic dielectrics, such as a MacNeille polarizer. A Cartesian reflective polarizer has a polarization axis state, and includes both wire-grid polarizers and polymeric multilayer optical films such as can be produced by extrusion and subsequent stretching of a multilayer polymeric laminate. In one embodiment, PRP 190 is aligned so that one polarization axis is parallel to a first polarization state 195, and perpendicular to a second polarization state 196. In one embodiment, the first polarization state 195 can be the s-polarization state, and the second polarization state 196 can be the p-polarization state. In another embodiment, the first polarization state 195 can be the p-polarization state, and the second polarization state 196 can be the s-polarization state. As shown in FIG. 1B, the first polarization state 195 is perpendicular to each of the end faces 170, 175, 180, 185.

A Cartesian reflective polarizer film provides the polarizing beam splitter with an ability to pass input light rays that are not fully collimated, and that are divergent or skewed from a central light beam axis, with high efficiency. The Cartesian reflective polarizer film can comprise a polymeric multilayer optical film that comprises multiple layers of dielectric or polymeric material. Use of dielectric films can have the advantage of low attenuation of light and high efficiency in passing light. The multilayer optical film can comprise polymeric multilayer optical films such as those described in U.S. Pat. No. 5,962,114 (Jonza et al.) or U.S. Pat. No. 6,721,096 (Bruzzone et al.).

Figure 2:
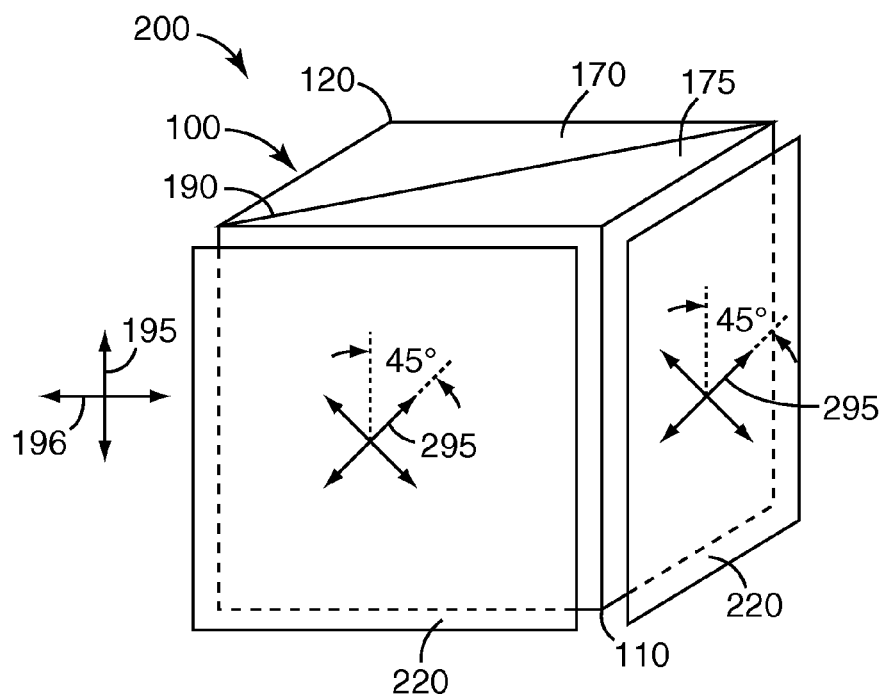
FIG. 2 is a perspective view of a PBS.

FIG. 2 is a perspective view of the alignment of a quarter-wave retarder to a PBS, as used in some embodiments. Quarter-wave retarders can be used to change the polarization state of incident light. PBS retarder system 200 includes PBS 100 having first and second prisms 110 and 120. A quarter-wave retarder 220 is disposed adjacent the first prism face 130 and the second prism face 140. PRP 190 includes a Cartesian reflective polarizer film aligned to first polarization state 195. Quarter-wave retarder 220 includes a quarter-wave polarization state 295 that can be aligned at 45° to first polarization state 195. Although FIG. 2 shows polarization state 295 aligned at 45° to first polarization state 195 in a clockwise direction, polarization state 295 can instead be aligned at 45° to first polarization state 195 in a counterclockwise direction. In some embodiments, quarter-wave polarization state 295 can be aligned at any degree orientation to first polarization state 195, for example from 90° in a counter-clockwise direction to 90° in a clockwise direction. It can be advantageous to orient the retarder at approximately +/−45° as described, since circularly polarized light results when linearly polarized light passes through a quarter-wave retarder so aligned to the polarization state. Other orientations of quarter-wave retarders can result in s-polarized light not being fully transformed to p-polarized light, and p-polarized light not being fully transformed to s-polarized light upon reflection from the mirrors, resulting in reduced efficiency of the optical elements described elsewhere in this description.

Figure 3C:
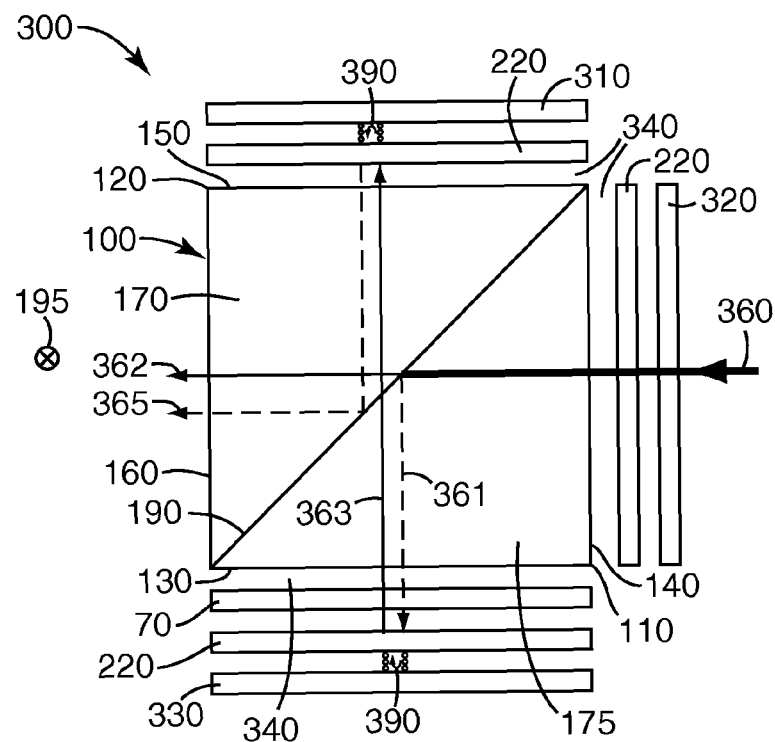

FIG. 3A is a top view of a light combiner. In FIG. 3A, a light combiner 300 includes PBS 100 having PRP 190 disposed between the diagonal faces of prisms 110 and 120. Prism 110 includes first and second prism faces 130, 140 having a 90° angle between them. Prism 120 includes third and fourth prism face 150, 160 having a 90° angle between them. PRP 190 can include a Cartesian reflective polarizer aligned to the first polarization state 195 (in this view, perpendicular to the page). PRP 190 can instead include a non-Cartesian polarizer. PRP 190 further includes a color-selective dichroic mirror (element 20 in FIG. 1A) disposed adjacent to the reflective polarizer (not shown). In FIGS. 3A-3D, the color-selective dichroic mirror is disposed to reflect actinic light before it intercepts the reflective polarizer, as described with reference to FIG. 3B. Light combiner 300 further includes an optional wavelength selective absorber 70, disposed to absorb any actinic light that passes through components of PRP 190.

Optional wavelength selective absorber 70 can be disposed adjacent to any of the prism faces where actinic light is not required to pass; for example, in FIGS. 3A-3D, first prism face 130, second prism face 140, or both first and second prism faces 130, 140. It is to be understood, however, that the optional wavelength selective absorber 70 can be disposed anywhere in the optical path of the actinic light transmitted by the color-selective dichroic mirror 20. In one embodiment, the blue wavelength selective absorber can be placed between the color selective dichroic mirror 20 and the reflective polarizer 30 of PRP 190.

Light combiner 300 includes quarter-wave retarders 220 disposed facing the first, second and third prism faces 130, 140, and 150. Quarter-wave retarders 220 are aligned at a 45° angle to the first polarization state 195. An optically transmissive material 340 is disposed between each quarter-wave retarder 220 and their respective prism faces. The optically transmissive material 340 can be any material that has an index of refraction equal to or lower than the index of refraction of prisms 110, 120. In one embodiment, the optically transmissive material 340 is air. In another embodiment, the optically transmissive material 340 is an optical adhesive which bonds quarter-wave retarders 220 to their respective prism faces.

Light combiner 300 includes a first, second and third reflector 310, 320, 330 disposed facing quarter-wave retarders 220 as shown. Each of the reflectors 310, 320, 330 can be separate from the adjacent quarter-wave retarder 220 as shown in FIG. 3A. Further, each of the reflectors 310, 320, 330 can be in direct contact with the adjacent quarter-wave retarder 220. Alternatively, each of the reflectors 310, 320, 330 can be adhered to the adjacent quarter-wave retarder 220 with an optical adhesive. The optical adhesive can be a curable adhesive. The optical adhesive can also be a pressure-sensitive adhesive.

Light combiner 300 can be a two color combiner. In this embodiment, reflector 310 is a first color-selective dichroic filter, and one of the reflectors 320, 330 is a second color-selective dichroic filter, selected to transmit a first and a second color light, respectively, and reflect other colors of light. The third reflector is a mirror. By mirror is meant a specular reflector selected to reflect substantially all colors of light. The first and second color light can have minimum overlap in the spectral range, however there can be substantial overlap if desired.

In one embodiment shown in FIG. 3A, light combiner 300 is a three color combiner. In this embodiment, reflectors 310, 320, 330 are first, second and a third color-selective dichroic filter selected to transmit the first, second, and a third color light respectively, and reflect other colors of light. In one aspect, the first, second and third color light have minimum overlap in the spectral range, however there can be substantial overlap, if desired. A method of using light combiner 300 of this embodiment includes directing a first color light 350 toward first color-selective dichroic filter 310, directing a second color light 360 toward second color-selective dichroic filter 320, directing a third color light 370 toward third color-selective dichroic filter 330, and receiving combined light 380 from the fourth face of PBS 100. The path of each of the first, second and third color light 350, 360, 370 are further described with reference to FIGS. 3B-3D.

In one embodiment, each of the first, second and third color light 350, 360, 370 can be unpolarized light and the combined light 380 is unpolarized. In a further embodiment, each of the first, second and third color lights 350, 360, 370 can be blue, green and red unpolarized light, respectively, and the combined light 380 can be unpolarized white light. Each of the first, second, and third color lights 350, 360, 370 can comprise light from a light emitting diode (LED) source. Various light sources can be used such as lasers, laser diodes, organic LED's (OLED's), and non solid-state light sources such as ultra high pressure (UHP), halogen or xenon lamps with appropriate collectors or reflectors. An LED light source can have advantages over other light sources, including economy of operation, long lifetime, robustness, efficient light generation and improved spectral output. Although not shown in FIGS. 3A-3D, color combiner 300 can include optional light tunnels 40, described elsewhere.

Turning now to FIG. 3B, the optical path of first color light 350 through light combiner 300 is described for the embodiment where first color light 350 is unpolarized. In this embodiment, first color light 350 is an actinic light that can be damaging to an unprotected reflective polarizer. A major portion 351 of first color light 350 is reflected from PRP 190. A minor portion 352 of first color light 350 passes through PRP 190 and is absorbed by optional wavelength selective absorber 70.

First color light 350 is directed through first color-selective dichroic filter 310, quarter-wave retarder 220, and enters PBS 100 through third prism face 150. First color light 350 intercepts PRP 190 and is split into major portion 351 which reflects from PRP 190 and minor portion 352 which transmits through PRP 190. Major portion 351 exits PBS 100 through fourth prism face 160.

Minor portion 352 passes through PRP 190, exits PBS 100 through first prism face 130, and is absorbed by optional wavelength selective absorber 70.

Turning now to FIG. 3C, the optical path of second color light 360 through light combiner 300 is described for the embodiment where second color light 360 is unpolarized. In this embodiment, unpolarized light comprising s-polarized second color light 365 and p-polarized second color light 362, exit PBS 100 through fourth prism face 160.

Second color light 360 is directed through second color-selective dichroic filter 320, quarter-wave retarder 220, and enters PBS 100 through second prism face 140. Second color light 360 intercepts PRP 190 and is split into p-polarized second color light 362 and s-polarized second color light 361. P-polarized second color light 362 passes through PRP 190 and exits PBS 100 through fourth prism face 160.

S-polarized second color light 361 is reflected from PRP 190, exits the first prism face 130 of PBS 100, passes through optional wavelength selective absorber 70, and changes to circularly polarized light 390 as it passes through quarter-wave retarder 220. Circularly polarized light 390 reflects from third color-selective dichroic filter 330, changing the direction of circular polarization, passes through quarter-wave retarder 220, passes through optional wavelength selective absorber 70, and enters PBS 100 through first prism face 130 as p-polarized second color light 363. Light ray 363 passes through PRP 190, exits PBS 100 through third prism face 150, and changes to circularly polarized light 390 as it passes through quarter-wave retarder 220. Circularly polarized light 390 reflects from first color-selective dichroic filter 310, changing the direction of circular polarization, passes through quarter-wave retarder 220, and enters PBS 100 through third prism face 150 as s-polarized second color light 365. S-polarized second color light 365 reflects from PRP 190 and exits PBS 100 through fourth prism face 160.

Figure 3D:
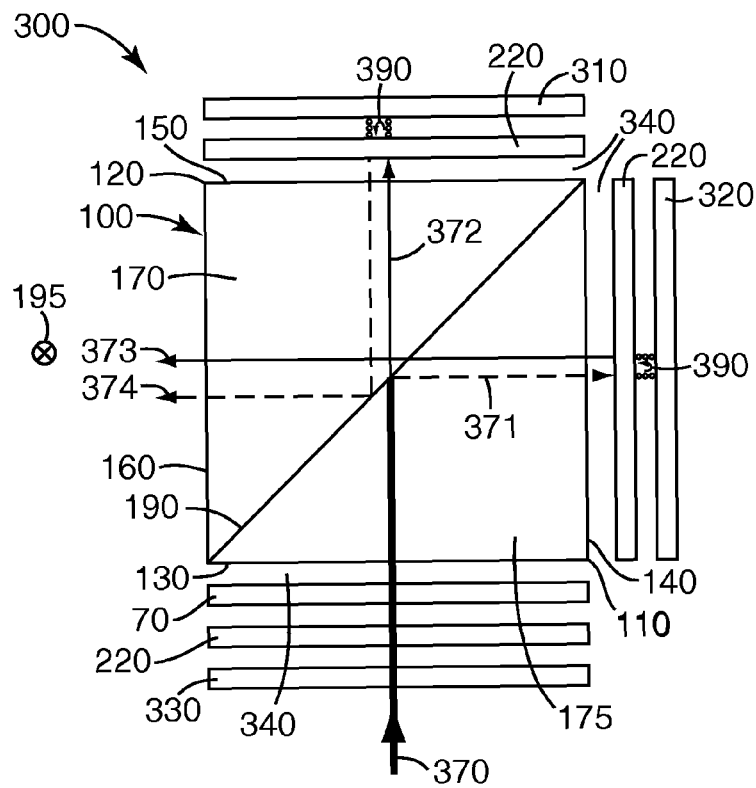

Turning now to FIG. 3D, the optical path of third color light 370 through light combiner 300 is described for the embodiment where third color light 370 is unpolarized. In this embodiment, unpolarized light comprising s-polarized third color light 374, and p-polarized third color light 373, exits PBS 100 through fourth prism face 160.

Third color light 370 is directed through third color-selective dichroic filter 330, quarter-wave retarder 220, optional wavelength selective absorber 70, and enters PBS 100 through first prism face 130. Third color light 370 intercepts PRP 190 and is split into p-polarized third color light 372 and s-polarized third color light 371. P-polarized third color light 372 passes through PRP 190, exits the third prism face 150, and changes to circularly polarized light 390 as it passes through quarter-wave retarder 220. Circularly polarized light 390 reflects from first color-selective dichroic filter 310, changing the direction of circular polarization, passes through quarter-wave retarder 220, and enters PBS 100 through third prism face 150 as s-polarized third color light 374. S-polarized third color light 374 reflects from PRP 190 and exits PBS 100 through fourth prism face 160.

S-polarized third color light 371, reflects from PRP 190, exits PBS 100 through the second prism face 140 and changes to circularly polarized light 390 as it passes through quarter-wave retarder 220. Circularly polarized light 390 reflects from second color-selective dichroic filter 320, changing the direction of circular polarization, passes through quarter-wave retarder 220 and enters PBS 100 through second prism face 140 as p-polarized third color light 373. P-polarized third color light 373, passes through PRP 190 and exits PBS 100 through fourth prism face 160.

Figure 4:
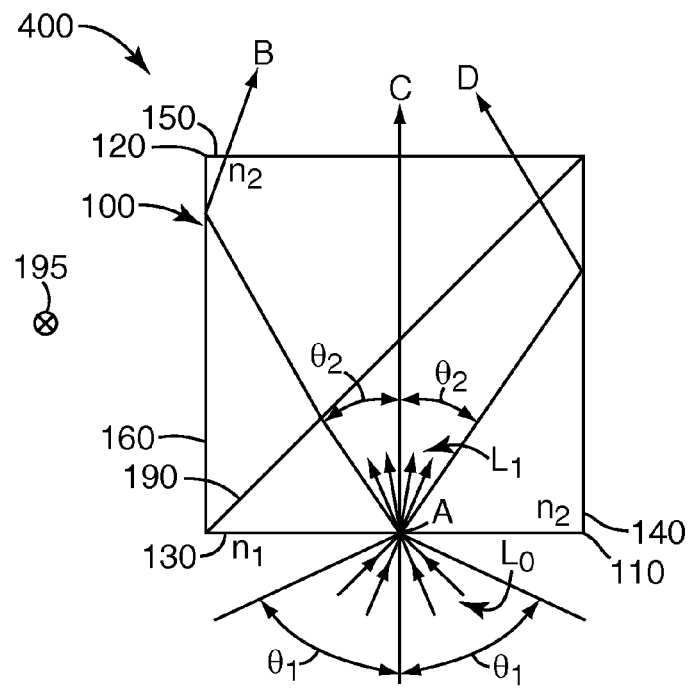
FIG. 4 is a top view of a polished PBS.

FIG. 4 shows a top view of a polished PBS 400. According to one embodiment, the first, second, third and fourth prism faces 130, 140, 150, 160 of prisms 110 and 120 are polished external surfaces. According to another embodiment, all of the external faces of the PBS 100 (including end faces, not shown) are polished faces that provide TIR of oblique light rays within PBS 100. The polished external surfaces are in contact with a material having an index of refraction "$n_1$" that is less than the index of refraction "$n_2$" of prisms 110 and 120. TIR improves light utilization in polished PBS 400, particularly when the light directed into polished PBS 400 is not collimated along a central axis, i.e. the incoming light is either convergent or divergent. At least some light is trapped in polished PBS 400 by total internal reflections until it leaves through third prism face 150. In some cases, substantially all of the light is trapped in polished PBS 400 by total internal reflections until it leaves through third prism face 150.

As shown in FIG. 4, light rays $L_0$ enter first prism face 130 within a range of angles $\theta_1$. Light rays $L_1$ within polished PBS 400 propagate within a range of angles $\theta_2$ such that the TIR condition is satisfied at prism faces 140, 160 and the end faces (not shown). Light rays "AB", "AC" and "AD" represent three of the many paths of light through polished PBS 400, that intersect PRP 190 at different angles of incidence before exiting through third prism face 150. Light rays "AB" and "AD" also both undergo TIR at prism faces 160 and 140, respectively, before exiting. It is to be understood that ranges of angles $\theta_1$ and $\theta_2$ can be a cone of angles so that reflections can also occur at the end faces of polished PBS 400. In one embodiment, PRP 190 is selected to efficiently split light of different polarizations over a wide range of angles of incidence. A polymeric multilayer optical film is particularly well suited for splitting light over a wide range of angles of incidence. Other reflective polarizers including MacNeille polarizers and wire-grid polarizers can be used, but are less efficient at splitting the polarized light. A MacNeille polarizer does not efficiently transmit light at angles of incidence that differ substantially from the design angle, which is typically 45 degrees to the polarization selective surface, or normal to the input face of the PBS. Efficient splitting of polarized light using a MacNeille polarizer can be limited to incidence angles below about 6 or 7 degrees from the normal, since significant reflection of the p-polarization state can occur at some larger angles, and significant transmission of s-polarization state can also occur at some larger angles. Both effects can reduce the splitting efficiency of a MacNeille polarizer. Efficient splitting of polarized light using a wire-grid polarizer typically requires an air gap adjacent one side of the wires, and efficiency drops when a wire-grid polarizer is immersed in a higher index medium. A wire-grid polarizer used for splitting polarized light is shown, for example, in PCT publication WO 2008/1002541.

Figure 5:
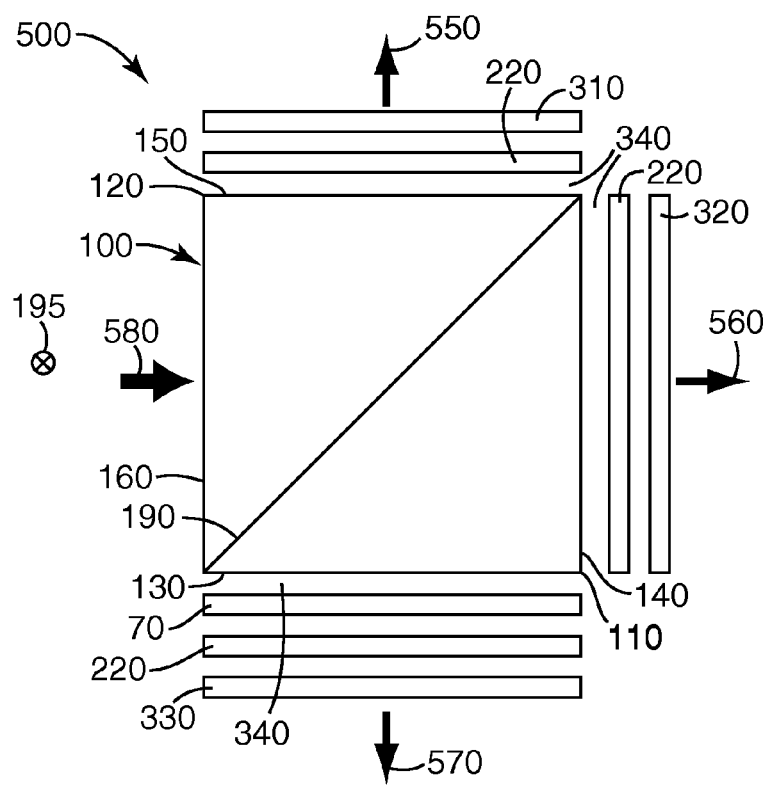
FIG. 5 is a top view schematic of a light splitter.

FIG. 5 is a top view schematic representation of a light splitter 500 according to one aspect of the invention. Light splitter 500 uses the same components as the light combiner shown in FIGS. 3A-3D, but functions in reverse, i.e. combined light 580 is directed toward fourth prism face 160, and split into a first, second and third received light 550, 560, 570 having first, second and third color, respectively. In FIG. 5, light splitter 500 includes PBS 100 having PRP 190 disposed between the diagonal faces of prisms 110, 120. Prism 110 includes first and second prism faces 130, 140 having a 90° angle between them. Prism 120 includes third and fourth prism faces 150, 160 having a 90° angle between them. PRP 190 can be a Cartesian reflective polarizer aligned to the first polarization state 195 (in this view, perpendicular to the page), or a non-Cartesian polarizer, but a Cartesian reflective polarizer is preferred. PRP 190 further includes a color-selective dichroic mirror (element 20 in FIG. 1A) disposed adjacent to the reflective polarizer (not shown). In FIG. 5, the color-selective dichroic mirror is disposed to reflect actinic light before it intercepts the reflective polarizer, as described with reference to FIG. 3B. Light combiner 300 further includes an optional wavelength selective absorber 70, disposed to absorb any actinic light that passes through PRP 190; in FIG. 5, first prism face 130, second prism face 140, or both first and second prism faces 130, 140. Generally, the optional wavelength selective absorber 70 can be disposed anywhere in the optical path of the actinic light transmitted by the color-selective dichroic mirror. In one embodiment, the blue wavelength selective absorber can be placed between the color-selective dichroic mirror and the reflective polarizer. In another embodiment, blue wavelength absorber 70 can be placed adjacent second prism face 140.

Light splitter 500 also includes quarter-wave retarders 220 disposed facing the first, second and third prism faces 130, 140, and 150. The quarter-wave retarders 220 are aligned at a 45° angle to the first polarization state 195, as described elsewhere. An optically transmissive material 340 is disposed between each of the quarter-wave retarders 220 and their respective prism faces. Optically transmissive material 340 can be any material that has an index of refraction lower than the index of refraction of prisms 110,120. In one aspect, optically transmissive material 340 can be air. In one aspect, the optically transmissive material 340 can be an optical adhesive which bonds quarter-wave retarders 220 to their respective prism faces.

Light splitter 500 includes first, second and third reflector 310, 320, 330 disposed facing quarter-wave retarders 220 as shown. In one aspect, reflectors 310, 320, 330 can be separated from the adjacent quarter-wave retarder 220 as shown in FIG. 3A. In one aspect, reflectors 310, 320, 330 can be in direct contact with the adjacent quarter-wave retarder 220. In one aspect, reflectors 310, 320, 330 can be adhered to the adjacent quarter-wave retarder 220 with an optical adhesive.

In one embodiment, light splitter 500 is a two color splitter. In this embodiment, reflector 310 is a first color-selective dichroic filter, and one of the reflectors 320, 330 is a second color-selective dichroic filter, selected to transmit first and second color light, respectively, and reflect other colors of light. The third reflector is a mirror. By mirror is meant a specular reflector selected to reflect substantially all colors of light. In one aspect, the first and second color light have minimum overlap in the spectral range, however there can be substantial overlap, if desired.

In one embodiment, light splitter 500 is a three color splitter. In this embodiment, reflectors 310, 320, 330 are first, second and third color-selective dichroic filter selected to transmit first, second, and third color lights, respectively, and reflect other colors of light. In one aspect, first, second and third color lights have minimum overlap in the spectral range, however there can be substantial overlap, if desired. A method of using light splitter 500 of this embodiment includes the steps of directing combined light 580 toward fourth prism face 160 of PBS 100, receiving first color light 550 from color-selective dichroic filter 310, receiving second color light 560 from second color-selective dichroic filter 320, and receiving third color light 570 from third color-selective dichroic filter 330. The optical path of each of the combined, first, second and third received lights 580, 550, 560, 570 follow the description in FIGS. 3B-3D, however, the direction of all of the light rays is reversed.

In one embodiment, combined light 580 can be unpolarized light, and each of the first, second and third color lights 550, 560, 570 are unpolarized lights. In one embodiment, combined light 580 can be unpolarized white light, and each of the first, second and third color lights 550, 560, 570 are blue, green and red unpolarized lights, respectively. According to one aspect, combined light 580 comprises light from a light emitting diode (LED) source. Various light sources can be used such as lasers, laser diodes, organic LED's (OLED's), and non solid state light sources such as ultra high pressure (UHP), halogen or xenon lamps with appropriate collectors or reflectors. An LED light source can have advantages over other light sources, including economy of operation, long lifetime, robustness, efficient light generation and improved spectral output.

Figure 6A:
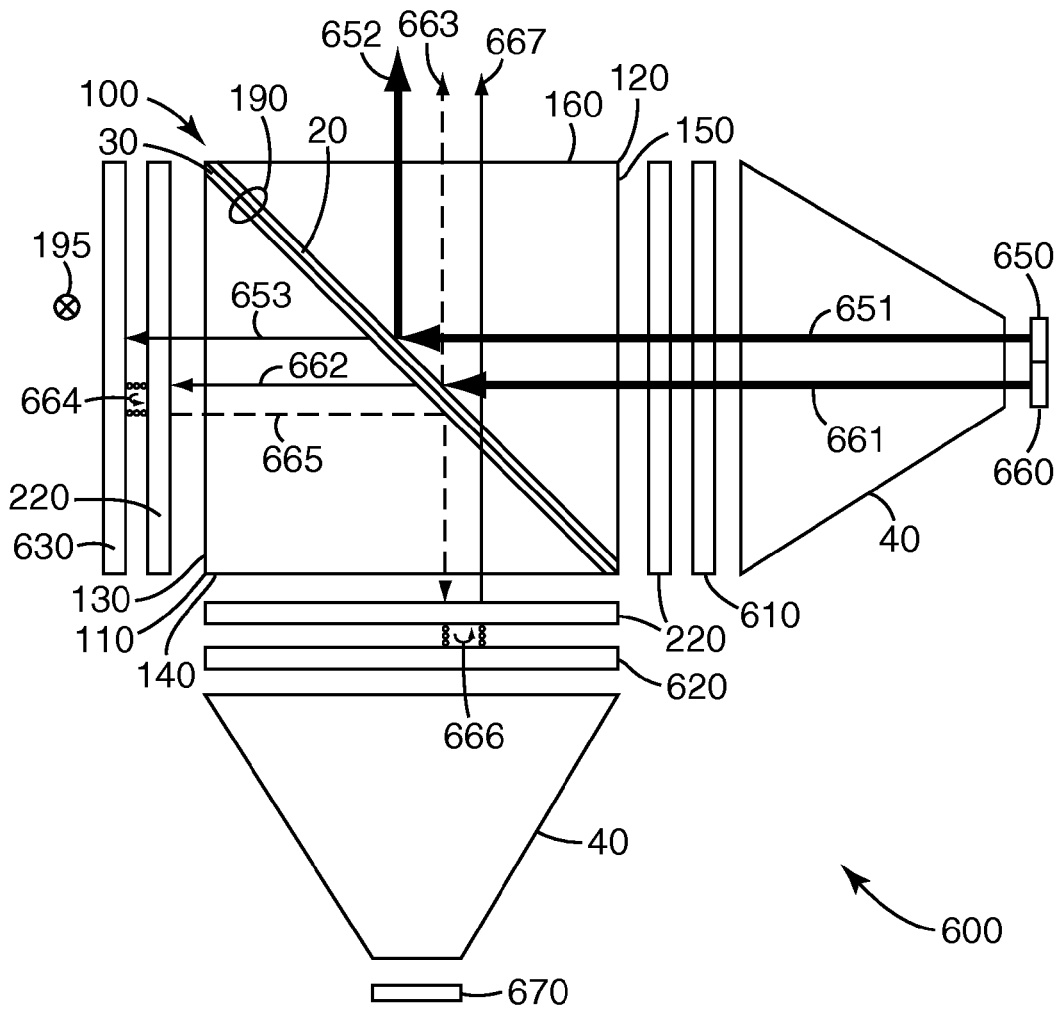
FIGS. 6A-6B shows a two channel color combiner.
Figure 6B:
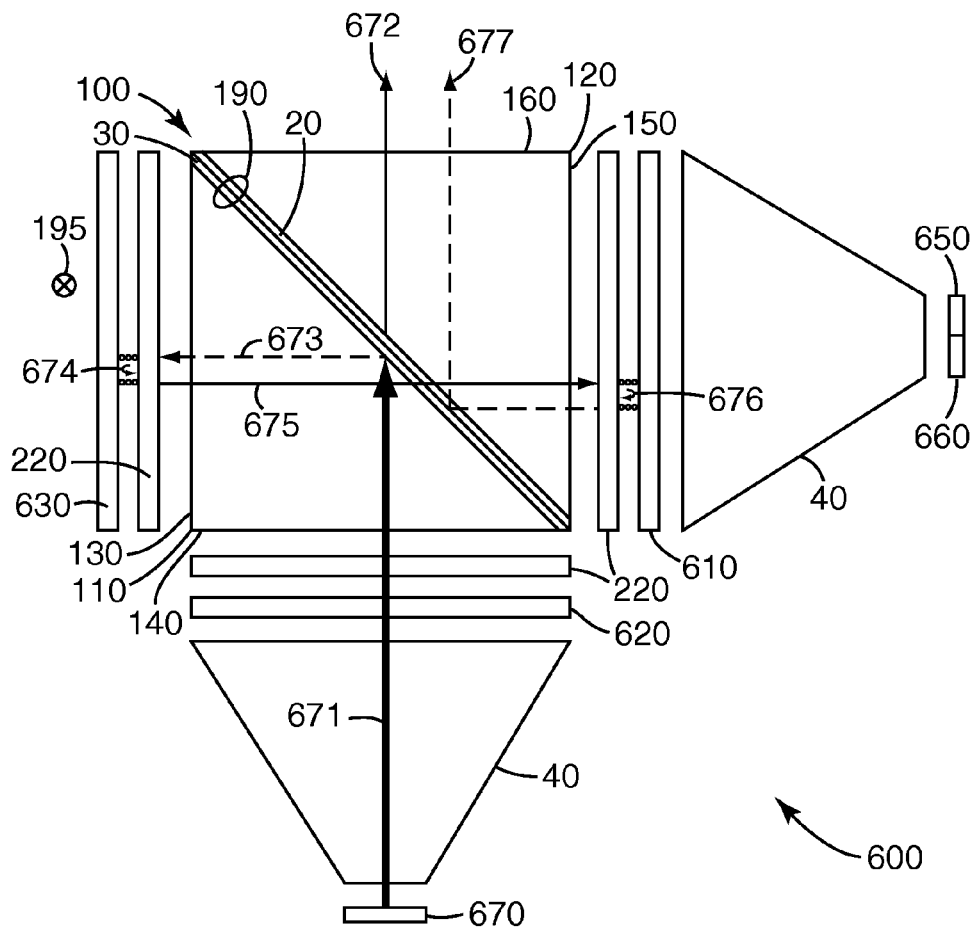

According to one aspect of the disclosure, FIG. 6A-6B shows a two channel color combiner 600 where a first color light source 650 and a second color light source 660 are disposed to inject light into the same prism face (i.e., third prism face 150) of PBS 100. According to one embodiment described below, first color light source 650 can be an unpolarized blue light source 650 and second color light source 660 can be an unpolarized red light source 660. A blue light 651 from blue light source 650 and a red light 661 from red light source 660 can be combined to reduce the number of components of color combiner 600. The blue and red lights 651, 661 may be mixed together using, for example, an integrating rod (not shown). According to one aspect, an optional light tunnel 40 or assemblies of lenses (not shown) can be provided for the blue, red and a green light source 650, 660, 670, to provide spacing that separates the light sources from PBS 100, as well as provide for some collimation of light, as described elsewhere.

Two channel color combiner 600 includes a green light reflective dichroic filter 610, a red light reflective dichroic filter 620, and a broadband mirror 630. Two channel color combiner 600 further includes an optional blue light selective absorber (not shown), as described elsewhere. In one embodiment, blue light selective absorber can be included in a broadband mirror 630, so that any blue light incident on broadband mirror 630 is absorbed, rather than reflected (as shown in FIG. 6A, and further described below). In another embodiment, blue light selective absorber can be positioned anywhere in the blue light optical path that is transmitted through blue light reflective dichroic mirror 20, as described elsewhere.

Turning now to FIG. 6A, the optical path of blue light 651 from blue light source 650 and red light 661 from red light source 660 through light combiner 600 is described for the embodiment where blue light 651 and red light 661 are unpolarized. In this embodiment, blue light 651 is an actinic light that can be damaging to an unprotected reflective polarizer. A major portion 652 of blue light 651 is reflected from PRP 190. A minor portion 653 of blue light 651 passes through color-selective dichroic mirror 20 in PRP 190 and is absorbed by the optional blue light selective absorber (not shown).

Blue light 651 from blue light source 650 passes through optional light tunnel 40, green light reflective dichroic filter 610, quarter-wave retarder 220 and enters PBS 100 through third prism face 150. Blue light 651 intercepts PRP 190 and is split into reflected major portion 652 of blue light 651 and transmitted minor portion 653 of blue light 651. Major portion 652 exits PBS 100 as unpolarized major portion 652 of blue light 651. Minor portion 653 of blue light 651 exits PBS 100 through first prism face 130, passes through quarter-wave retarder 220, and is absorbed by blue light selective absorber included in broadband mirror 630.

Red light 661 from red light source 660 passes through optional light tunnel 40, green light reflective dichroic filter 610, quarter-wave retarder 220 and enters PBS 100 through third prism face 150. Red light 661 intercepts PRP 190 and is split into p-polarized red light ray 662 and s-polarized red light ray 663. S-polarized red light ray 663 reflects from PRP 190 and exits PBS 100 through fourth prism face 160 as s-polarized red light ray 663.

P-polarized red light ray 662 passes through PRP 190, exits PBS 100 through first prism face 130, and changes to circularly polarized red light ray 664 as it passes through quarter-wave retarder 220. Circularly polarized red light ray 664 reflects from broadband mirror 630 changing direction of circular polarization, passes through quarter-wave retarder 220 changing to s-polarized red light ray 665, enters PBS 100 through first prism face 130, reflects from PRP 190, and exits PBS 100 through second prism face 140. S-polarized red light ray 665 changes to circularly polarized red light ray 666 as it passes through quarter-wave retarder 220, reflects from red light reflective dichroic filter 620 changing direction of circular polarization, and changes to p-polarized red light ray 667 as it passes through quarter-wave retarder 220. P-polarized red light ray 667 enters PBS 100 through second prism face 140, passes unchanged through PRP 190, and exits PBS 100 through fourth prism face 160 as p-polarized red light ray 667.

Turning now to FIG. 6B, the optical path of green light 671 from green light source 670 through light combiner 600 is described for the embodiment where green light 671 is unpolarized. In this embodiment, unpolarized light comprising p-polarized green light ray 672 and s-polarized green light ray 677 exit PBS 100 through fourth prism face 160.

Green light 671 from green light source 670 passes through optional light tunnel 40, red light reflective dichroic filter 620, quarter-wave retarder 220 and enters PBS 100 through second prism face 140. Green light 671 intercepts PRP 190 and is split into p-polarized green light ray 672 and s-polarized green light ray 673. P-polarized green light ray 672 passes through PRP 190 and exits PBS 100 through fourth prism face 160 as p-polarized green light ray 672.

S-polarized green light ray 673 reflects from PRP 190, exits PBS 100 through first prism face 130, and changes to circularly polarized green light ray 674 as it passes through quarter-wave retarder 220. Circularly polarized green light ray 674 reflects from broadband mirror 630 changing direction of circular polarization, passes through quarter-wave retarder 220 changing to p-polarized green light ray 675, enters PBS 100 through first prism face 130, passes through PRP 190, and exits PBS 100 through third prism face 150. P-polarized green light ray 675 changes to circularly polarized green light ray 676 as it passes through quarter-wave retarder 220, reflects from green light reflective dichroic filter 610 changing direction of circular polarization, and changes to s-polarized green light ray 677 as it passes through quarter-wave retarder 220. S-polarized green light ray 677 enters PBS 100 through third prism face 150, reflects from PRP 190, and exits PBS 100 through fourth prism face 160 as s-polarized green light ray 677.

In another embodiment (not shown) of two channel color combiner 600, the relative position of broadband mirror 630 can be switched with second color-selective dichroic filter 620, optional light tunnel 40, and third light source 670. In this embodiment, broadband mirror 630 is adjacent second prism face 140; and second color-selective dichroic filter 620, optional light tunnel 40, and third light source 670 are adjacent first prism face 130. Blue wavelength-selective absorber 70 can be place anywhere in the optical path of blue light that is transmitted through color-selective dichroic mirror 20, as described elsewhere with reference to FIGS. 3A-3D.

Figure 7A:
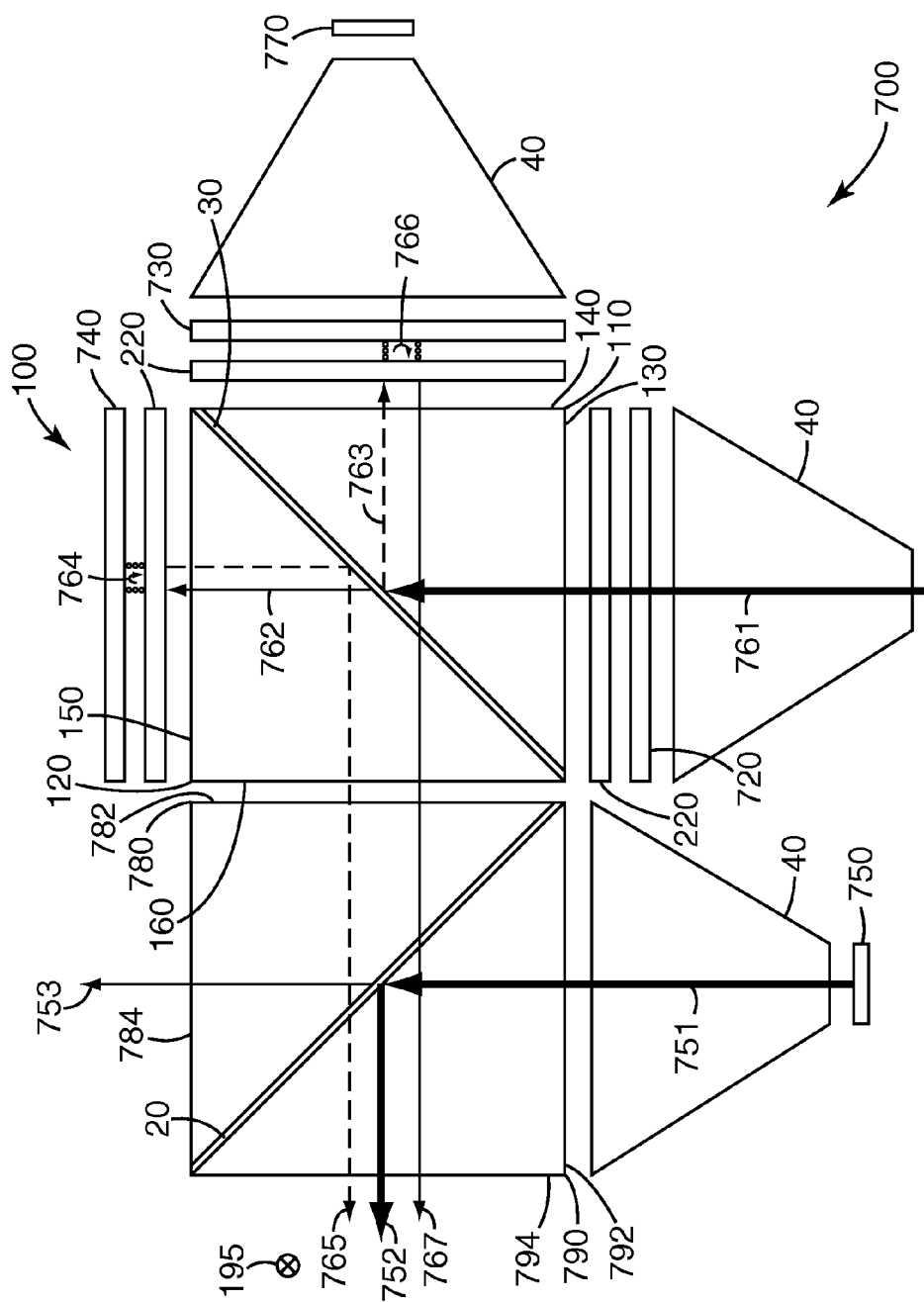
FIGS. 7A-7B shows a color combiner.
Figure 7B:
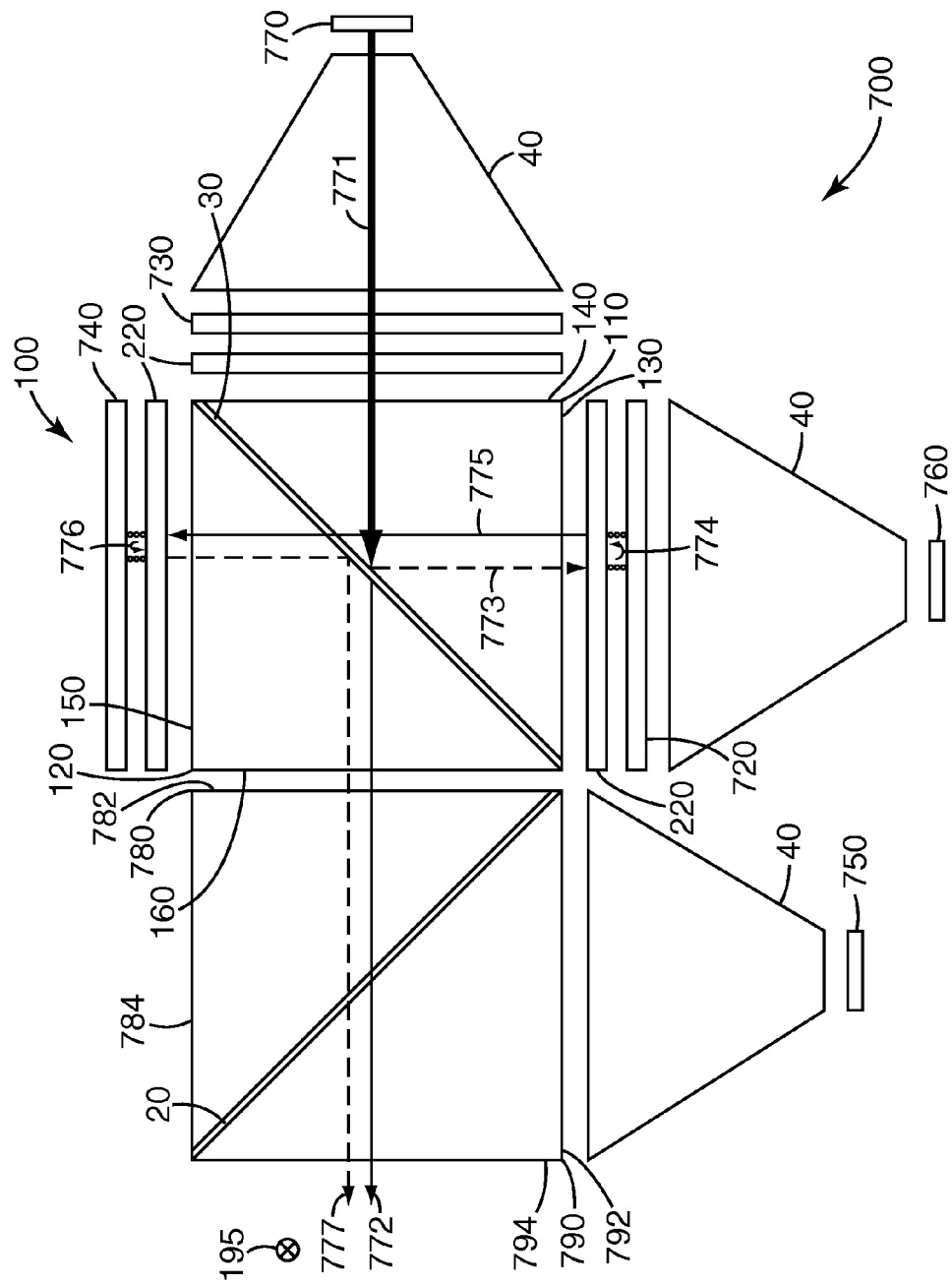

According to one aspect, FIGS. 7A-7B shows a color combiner 700 where the PRP 190 of FIGS. 3A-3D and FIGS. 6A-6B is separated into the component color-selective dichroic mirror 20 and the reflective polarizer 30, as described below. Color-selective dichroic mirror 20 can be a free-standing color-selective dichroic mirror (e.g., a pellicle), or it can be disposed on the diagonal of a prism, such as a third and a fourth prism 780, 790 as shown in FIGS. 7A-7B. In this aspect, the actinic light path (i.e., a first color light 751 from a first color light source 750) is further separated from the reflective polarizer 30.

FIG. 7A-7B shows a color combiner 700 where a second color light source 760 and a third color light source 770 are disposed to inject light into PBS 100. Second color light source 760 and third color light source 770 exit first PBS 100 through an output surface (fourth prism face 160) in an output direction.

First color light source 750 is disposed to inject a first color light 751 (the actinic light) to be combined with a second color light 761 from second color light source 760 and a third color light 771 from third color light source 770, but without entering PBS 100. According to one embodiment described below, first color light source 750 can be an unpolarized blue light source 750, second color light source 760 can be an unpolarized red light source 760, and third color light source 770 can be an unpolarized green light source 770. A blue light 751 from blue light source 750, a red light 761 from red light source 760, and a green light 771 from green light source 770 can be combined to improve the durability of color combiner 700. According to one aspect, an optional light tunnel 40 or assemblies of lenses (not shown) can be provided for the blue, red and a green light source 750, 760, 770, to provide spacing that separates the light sources from PBS 100, as well as provide for some collimation of light, as described elsewhere.

Color combiner 700 includes a green light reflective dichroic filter 720, a red light reflective dichroic filter 730, and a broadband mirror 740. In one embodiment, a blue light selective absorber can be included in the blue light optical path that is transmitted through blue light reflective dichroic mirror 20, as described elsewhere.

Turning now to FIG. 7A, the optical path of blue light 751 from blue light source 750 through light combiner 700 is described for the embodiment where blue light 751 is unpolarized. In this embodiment, blue light 751 is an actinic light that can be damaging to an unprotected reflective polarizer. A major portion 752 of blue light 751 is reflected from color-selective dichroic mirror 20. A minor portion 753 of blue light 751 passes through color-selective dichroic mirror 20, exits color combiner 700, and is optionally absorbed by the optional blue light selective absorber (not shown).

Blue light 751 from blue light source 750 passes through optional light tunnel 40, enters fourth prism 790 through a seventh prism face 792 and intercepts color-selective dichroic mirror 20. Blue light 751 is split into reflected major portion 752 of blue light 751 and transmitted minor portion 753 of blue light 751. The major portion 752 of blue light 751 exits fourth prism 790 through an eighth prism face 794 in an output direction. The minor portion 753 of blue light 751 passes through color-selective dichroic mirror 20, and leaves color combiner 700 by exiting third prism 780 through a sixth prism face 784.

Returning to FIG. 7A, the optical path of red light 761 from red light source 760 through light combiner 700 is described for the embodiment where red light 761 is unpolarized. In this embodiment, unpolarized light comprising p-polarized red light ray 767 and s-polarized red light ray 765 exits fourth prism 790 through eighth prism face 794 in an output direction.

Red light 761 from red light source 760 passes through optional light tunnel 40, green light reflective dichroic filter 720, quarter-wave retarder 220 and enters PBS 100 through first prism face 130. Red light 761 intercepts reflective polarizer 30 and is split into p-polarized red light ray 762 and s-polarized red light ray 763. P-polarized red light ray 762 passes through reflective polarizer 30, exits PBS 100 through third prism face 150, and changes to circularly polarized red light ray 764 as it passes through quarter-wave polarizer 220. Circularly polarized red light ray 764 reflects from broadband mirror 740 changing direction of circular polarization, changes to s-polarized red light ray 765 as it passes through quarter-wave retarder 220, and enters PBS 100 through third prism face 150. S-polarized red light ray 765 reflects from reflective polarizer 30, exits PBS 100 through fourth prism face 160, enters third prism 780 through fifth prism face 782, passes through color-selective dichroic mirror 20, and exits fourth prism 790 through eighth prism face 794 as s-polarized red light ray 765.

S-polarized red light ray 763 reflects from reflective polarizer 30, exits PBS 100 through second prism face 140, and changes to circularly polarized red light ray 766 as it passes through quarter-wave retarder 220. Circularly polarized red light ray 766 reflects from red light reflective dichroic filter 730 changing direction of circular polarization, passes through quarter-wave retarder 220 changing to p-polarized red light ray 767, enters PBS 100 through second prism face 140, passes through reflective polarizer 30, and exits PBS 100 through fourth prism face 160. P-polarized red light ray 767 enters third prism 780 through fifth prism face 782, passes through color-selective dichroic mirror 20, and exits fourth prism 790 through eighth prism face 794 as p-polarized red light ray 767.

Turning now to FIG. 7B, the optical path of green light 771 from green light source 770 through light combiner 700 is described for the embodiment where green light 771 is unpolarized. In this embodiment, unpolarized light comprising p-polarized green light ray 772 and s-polarized green light ray 777 exit fourth prism 790 through eighth prism face 794.

Green light 771 from green light source 770 passes through optional light tunnel 40, red light reflective dichroic filter 730, quarter-wave retarder 220 and enters PBS 100 through second prism face 140. Green light 771 intercepts reflective polarizer 30 and is split into p-polarized green light ray 772 and s-polarized green light ray 773. P-polarized green light ray 772 passes through reflective polarizer 30, exits PBS 100 through fourth prism face 160, enters third prism 780 through fifth prism face 782, passes through color-selective dichroic mirror 20, and exits fourth prism 790 through eighth prism face 794 as p-polarized green light ray 772.

S-polarized green light ray 773 reflects from reflective polarizer 30, exits PBS 100 through first prism face 130, and changes to circularly polarized green light ray 774 as it passes through quarter-wave retarder 220. Circularly polarized green light ray 774 reflects from green light reflective dichroic filter 720 changing direction of circular polarization, passes through quarter-wave retarder 220 changing to p-polarized green light ray 775, enters PBS 100 through first prism face 130, passes through reflective polarizer 30, and exits PBS 100 through third prism face 150. P-polarized green light ray 775 changes to circularly polarized green light ray 776 as it passes through quarter-wave retarder 220, reflects from broadband mirror 740 changing direction of circular polarization, and changes to s-polarized green light ray 777 as it passes through quarter-wave retarder 220. S-polarized green light ray 777 enters PBS 100 through third prism face 150, reflects from reflective polarizer 30, exits PBS 100 through fourth prism face 160, enters third prism 780 through fifth prism face 782, passes through color-selective dichroic mirror 20, and exits fourth prism 790 through eighth prism face 794 as s-polarized green light ray 777.

In another embodiment (not shown), the color combiner can include a fourth color light. In this embodiment, broadband mirror 740 can be replaced with a third color-selective dichroic mirror, optional light tunnel 40, and a fourth color light source, arranged in a similar manner as first and second color-selective dichroic filters 720, 730, optional light tunnels 40, and second and third light sources 760, 770 as shown in FIGS. 7A-7B. The third color-selective dichroic filter can be transparent to fourth color light, and reflect second and third color lights 760, 770.

In yet another embodiment (not shown), color-selective dichroic mirror 20 can instead be a blue light transmissive, red and green light reflective color-selective dichroic mirror. In this embodiment, red and green lights 761, 771, exit PBS 100 through fourth prism face 160 in an output direction as described previously, then enter third prism 780 through fifth prism face 782, reflect from color-selective dichroic mirror 20 and exit third prism 780 through sixth prism face 784. Blue light 750 enters fourth prism 790 as described previously, however a major portion 753 of blue light 751 passes through blue light transmissive color-selective dichroic mirror 20 and exits third prism 780 through sixth prism face 784; a minor portion 752 of blue light 750 reflects from blue light transmissive color-selective dichroic mirror and exits fourth prism 790 through eighth prism face 794.

Figure 9:
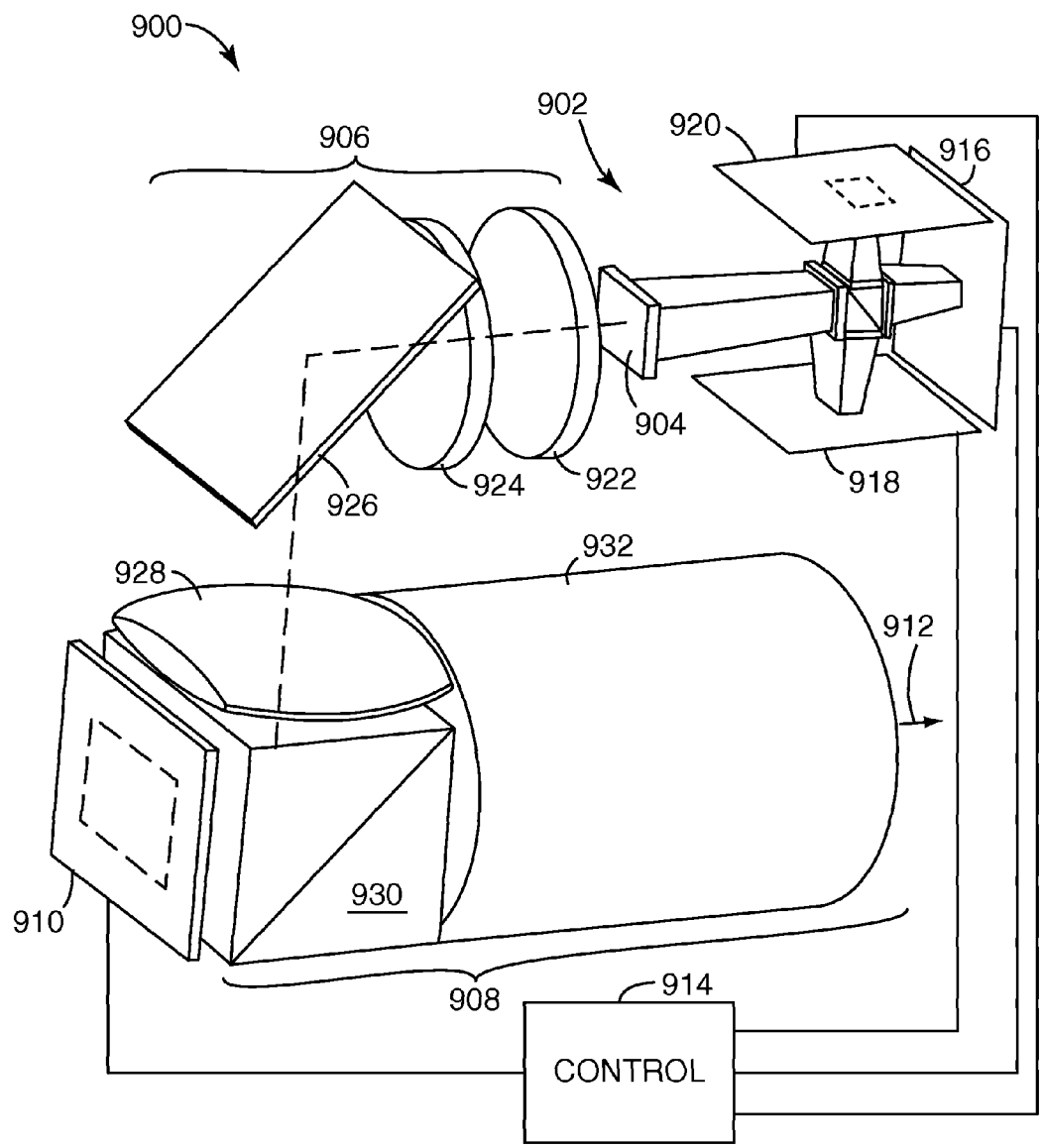
FIG. 9 is a schematic view of a projector.

FIG. 9 illustrates a projector 900 that includes a three color light combining system 902. The three color light combining system 902 provides a combined light output at output region 904. In one embodiment, combined light output at output region 904 is polarized. The combined light output at output region 904 passes through light engine optics 906 to projector optics 908.

The light engine optics 906 comprise lenses 922, 924 and a reflector 926. The projector optics 908 comprise a lens 928, a PBS 930 and projection lenses 932. One or more of the projection lenses 932 can be movable relative to the PBS 930 to provide focus adjustment for a projected image 912. A reflective imaging device 910 can modulate the polarization state of the light in the projector optics, so that the intensity of the light passing through the PBS 930 and into the projection lens will be modulated to produce the projected image 912. A control circuit 914 is coupled to the reflective imaging device 910 and to light sources 916, 918 and 920 to synchronize the operation of the reflective imaging device 910 with sequencing of the light sources 916, 918 and 920. In one aspect, a first portion of the combined light at output region 904 is directed through the projector optics 908, and a second portion of the combined light output can be recycled back into color combiner 902 through output region 904. The second portion of the combined light can be recycled back into color combiner by reflection from, for example: a mirror, a reflective polarizer, a reflective LCD and the like. The arrangement illustrated in FIG. 9 is exemplary, and the light combining systems disclosed can be used with other projection systems as well, including reflective micro-mirror imaging devices and the like. According to one alternative aspect, a transmissive imaging device can be used.

According to one aspect, a color light combining system as described above produces a three color (white) output. The system has high efficiency because polarization properties (reflection for S-polarized light and transmission for P-polarized light) of a polarizing beam splitter with reflective polarizer film have low sensitivity for a wide range of angles of incidence of source light. Additional collimation components can be used to improve collimation of the light from light sources in the color combiner. Without a certain degree of collimation, there will be significant light losses associated with variation of dichroic reflectivity as a function of angle of incidence (AOI), loss of TIR or increased evanescent coupling to frustrate the TIR, and/or degraded polarization discrimination and function in the PBS. In the present disclosure, polarizing beam splitters function as light pipes to keep light contained by total internal reflection, and released only through desired surfaces.

EXAMPLES

Figure 8:
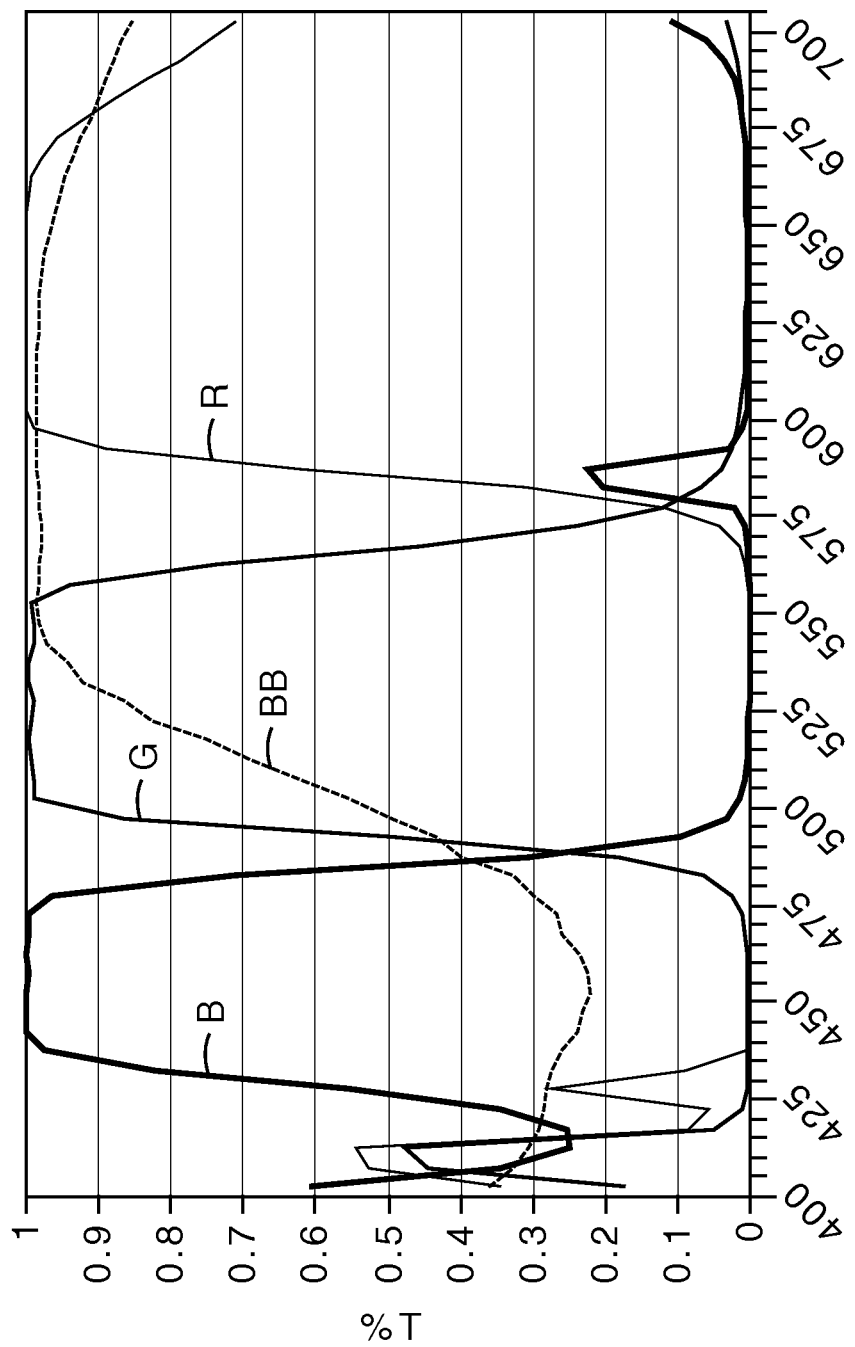
FIG. 8 is a graph of transmission spectra.

FIG. 8 is a graph of transmission spectra of red, green and blue dichroic filters (labeled R, G, B) and one dichroic mirror (labeled BB) that were modeled using TFCalc software (available from Software Spectra, Inc., Portland Oreg.). The TFCalc model started with a 10 pair optical stack of alternating $SiO_2$ and $TiO_2$ layers having a 460 nm quarter-wave thickness, and was optimized using a local search with needle optimization inserting additional $SiO_2$ and $TiO_2$ layers. The total thickness of the optical stack was limited to 3000 nm.

The three dichroic filters were modeled to transmit red (630 nm), green (530 nm), and blue (460 nm) light incident in an F1.5 cone with a Lambertian angular distribution at a 0° average incidence angle (i.e., perpendicular to the surface). The input side of each dichroic filter was in air. The dichroic mirror was modeled to block light centered at 460 nm, and transmit light at 530 nm and 630 nm, incident in an F1.5 cone with a Lambertian angular distribution at a 45° average incidence angle. The input side of the dichroic mirror was modeled in glass having a 1.52 refractive index.

Application of the transmission spectra of FIG. 8 to the color combiner shown in FIG. 3B shows incident blue light (first color light 350 in FIG. 3B) intercepted the dichroic mirror (BB) of PRP 190. The dichroic mirror reflected approximately 75% of the blue light (major portion 351 in FIG. 3B) and transmitted approximately 25% (minor portion 352 in FIG. 3B). The transmitted 25% of the blue light is of the same polarization state that is typically transmitted by the reflective polarizer in PRP 190 in a color combiner such as shown in FIGS. 3A-3D. The transmitted blue light can be removed from the system by optional wavelength selective absorber 70, resulting in approximately 12.5% of the blue light exposure of the reflective polarizer, compared to a color combiner without the dichroic mirror. In practice, the output of the blue LED may be increased to compensate for the 25% loss, so the actual blue light exposure of the reflective polarizer would be about 17% of the color combiner without the dichroic mirror. Similarly, the output of the green LED may also be increased to compensate for the loss through the dichroic mirror (from FIG. 8, approximately 75% transmission).

Typically, blue light is approximately 10 times more actinic than green light. For a configuration where the radiometric power of the green is 2 times the radiometric power of the blue, the above color combiner with the dichroic mirror would provide about 4 times the lifetime of the reflective polarizer compared to the color combiner without the dichroic mirror. Lifetime improvement could be increased further since scattering is sensitive to wavelength, and reduction of the short wavelength light exposure to the reflective polarizer will tend to reduce its tendency to scatter light.

The photopic efficiency of the normal color combiner (CC) configuration (i.e., without a wavelength selective dichroic mirror) was compared to the blue protected color combiner (BBCC). A normal color combiner (CC) without a wavelength selective dichroic mirror is shown, for example, in U.S. application Ser. No. 61/095,129, entitled LIGHT COMBINER, filed on Sep. 8, 2008. The spectral output of Phlatlight™ LEDs (available from Luminus Inc.) was used to generate the data for the photopic efficiency. The BBCC had 74.3% of the blue output and 88.0% of the green output, compared to the CC configuration. Since the blue light source is often not the LED color that limits the output of the device, the BBCC had 88% of the brightness and output of the CC.

Another configuration was modeled using a green light source with a longer wavelength, such as a II-VI semiconductor converted green LED. An improved color combiner can be made by using a blue and red LED with a green II-VI LED, which provides better spectral separation between the blue and green LEDs. The brightness drop between the CC and BBCC with a longer wavelength green II-VI LED (approximately 3% drop in brightness) was insignificant compared to the standard InGaN green LED (approximately 12% drop in brightness).

The blue light exposure of the reflective polarizer can be further reduced by placing a wavelength selective absorber (i.e. a blue filter) between the blue light reflecting dichroic mirror and the reflective polarizer, as described elsewhere. Using the same analysis as above, this approach has the potential of extending lifetime by a factor of 6.

A potential concern is that heating caused by absorbing the blue light could damage the reflective polarizer. The peak temperature can be reduced by placing a heat sink on both of the faces perpendicular to the reflective polarizer (i.e., end faces 170, 175, 180, 185 shown in FIG. 1B). Other methods for reducing the peak temperature include incorporating a layer of a material with a high thermal conductivity, such as a layer of sapphire, in the dichroic mirror. The sapphire layer may be yellow through doping with a suitable element such as cerium, by adding an additional blue-light absorbing coating, or by coating the sapphire with the blue reflecting dichroic coating.

Exposure of blue light on the reflective polarizer may not be uniform in either CC or BBCC color combiners. In CCs, non-uniformity can be caused by the illumination optics between the blue LED and the PBS (e.g., the light tunnels as described elsewhere). The blue reflector in the BBCC can add non-uniformity due to the angular selectivity and polarization selectivity of the blue dichroic.

The efficiency of the color combiner with a protective blue dichroic reflector may be higher than the simple analysis provided above. Several mechanisms may reduce the inefficiencies caused by the blue protective reflector. For example, the blue reflector can be optimized through a global optimization process. Design may be improved by using a global optimization, or by increasing the average index of the dielectric coating stack. Any combination of dielectric stack can be used, for example, an interference stack of $TiO_2$ and $Al_2O_3$ may be used instead of the $TiO_2$ and $SiO_2$ used in the examples above. In addition, practical losses were not included. While reflection from the reflective polarizer can be very high, light transmitted by the reflective polarizer can be rotated by a quarter-wave retarder 4 times, and scattering and/or depolarizing interactions with the reflective polarizer should be minimized. Scattering can be the most severe with blue light, and the retarder by design preferably provides quarter-wave retardance for all three colors. Such designs can be difficult to accomplish, and performance is usually a compromise. The efficiency calculations above also assume that a normal color combiner efficiently emits blue light initially transmitted by the reflective polarizer.

Another technique of improving system efficiency can be to use light sources that have a larger F-number for the blue light source than the green light source. In cases where the optical system requires that the F-number for the blue and green sources be the same, highly dispersive optical elements may be used, for example, binary lenses in a "fly's-eye" homogenizer. The larger F-number for the blue light may allow a more efficient blue protective filter to be designed.

Performance for the blue protected color combiner may increase relative to the normal configuration since the retarder in front of the blue LED only needs to function for the green and red wavelengths, the retarder in front of the red LED only needs to provide quarter-wave retardation for green light, and the retarder in front of the green LED only needs to provide quarter-wave retardation for red light. This could also provide an advantage to the longer wavelength green LED, such as II-VI, since there will be less difference in wavelengths between the red and green LEDs. There are a wider range of retarders available that function over a limited spectral range.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:
1. An optical element, comprising:
   a first color-selective dichroic filter having a first input surface, disposed to transmit a first color light beam perpendicular to the first input surface;

a color-selective dichroic mirror disposed to intercept the first color light beam at an angle of approximately 45 degrees;

a reflective polarizer disposed adjacent the color-selective dichroic mirror, opposite the first color-selective dichroic filter, wherein the color-selective dichroic mirror is capable of reflecting a major portion of the first color light beam, and transmitting a minor portion of the first color light beam;

a second color-selective dichroic filter having a second input surface disposed to transmit a second color light beam perpendicular to the second input surface, the second color light beam also intercepting the color-selective dichroic mirror at an angle of approximately 45 degrees, wherein the color-selective dichroic mirror is capable of transmitting a major portion of the second color light beam;

a first retarder disposed between the first color-selective dichroic filter and the reflective polarizer;

a second retarder disposed between the second color-selective dichroic filter and the reflective polarizer, a third color-selective dichroic filter having a third input surface disposed to transmit a third color light beam perpendicular to the third input surface, the third color light beam also intercepting the color-selective dichroic mirror at an angle of approximately 45 degrees; and a third quarter-wave retarder aligned at an approximately 45 degree angle to the first polarization state, disposed facing the third color-selective dichroic filter, wherein the reflective polarizer is aligned to a first polarization state and each retarder comprises a quarter-wave retarder aligned at an approximately 45 degree angle to the first polarization state, and wherein the color-selective dichroic mirror is capable of transmitting a major portion of the third color light beam.

2. The optical element of claim 1, wherein the first color light beam comprises a first wavelength range of light that is capable of degrading the reflective polarizer.

3. The optical element of claim 2, further comprising a wavelength selective absorber capable of absorbing the first wavelength range of light and disposed to intercept the minor portion of the first color light beam.

4. The optical element of claim 3, wherein the wavelength selective absorber is disposed between the color-selective dichroic mirror and the reflective polarizer.

5. The optical element of claim 2, wherein the first wavelength range of light comprises blue light or ultraviolet light.

6. The optical element of claim 2, wherein the first wavelength range of light comprises light having a wavelength range from 100 to 500 nanometers.

7. The optical element of claim 1, further comprising a first and second prism forming a polarizing beam splitter (PBS), and wherein the reflective polarizer and color-selective dichroic mirror are disposed on a diagonal of the PBS.

8. A color combiner comprising the optical element of claim 1.

9. The optical element of claim 1, wherein the first color light beam comprises a first color unpolarized light and the second color light beam comprises a second color unpolarized light different from the first color unpolarized light.

10. A color combiner comprising the optical element of claim 9.

11. The color combiner of claim 10, further comprising:
a first color light source emitting the first color unpolarized light;
a second color light source emitting the second color unpolarized light; and
a combined light comprising the first color unpolarized light and the second color unpolarized light.

12. A projection system comprising the color combiner of claim 11.

13. The optical element of claim 1, wherein the first color light beam comprises a first color unpolarized light, the second color light beam comprises a second color unpolarized light, and the third color light beam comprises a third color unpolarized light, wherein each of the first, second and third color unpolarized lights comprise a different wavelength range.

14. A color combiner comprising the optical element of claim 13.

15. The color combiner of claim 14, further comprising:
a first color light source emitting the first color unpolarized light;
a second color light source emitting the second color unpolarized light;
a third color light source emitting the third color unpolarized light; and
a combined light comprising the first color unpolarized light, the second color unpolarized light, and the third color unpolarized light.

16. A projection system comprising the color combiner of claim 14.

* * * * *